United States Patent
Shaaban et al.

(10) Patent No.: US 12,380,378 B2
(45) Date of Patent: Aug. 5, 2025

(54) SYSTEMS AND METHODS FOR GENERATING RELIABLE CLIENT BILLING QUOTES BASED ON A TEAM INCLUDING A PLURALITY OF MEMBERS

(71) Applicant: Fulcrum Global Technologies Inc., Chicago, IL (US)

(72) Inventors: Ahmed Farouk Shaaban, South Barrington, IL (US); Venkat Thandra, South Barrington, IL (US)

(*) Notice: Subject to any disclaimer, the term of this patent is extended or adjusted under 35 U.S.C. 154(b) by 0 days.

(21) Appl. No.: 17/718,034

(22) Filed: Apr. 11, 2022

(65) Prior Publication Data
US 2023/0094977 A1 Mar. 30, 2023

Related U.S. Application Data

(60) Provisional application No. 63/250,388, filed on Sep. 30, 2021.

(51) Int. Cl.
*G06Q 10/0631* (2023.01)
*G06F 3/04817* (2022.01)
(Continued)

(52) U.S. Cl.
CPC ... *G06Q 10/06311* (2013.01); *G06F 3/04817* (2013.01); *G06F 3/0484* (2013.01);
(Continued)

(58) Field of Classification Search
CPC ......... G06Q 10/06311; G06Q 10/1091; G06Q 30/0283; G06Q 30/04; G06Q 30/0611;
(Continued)

(56) References Cited

U.S. PATENT DOCUMENTS

| 5,189,633 A | 2/1993 | Bonadio |
| 5,812,128 A | 9/1998 | Sterling, IV |
| (Continued) | | |

FOREIGN PATENT DOCUMENTS

| JP | 2021033497 A | 3/2021 |
| WO | 2016004123 A1 | 1/2016 |
| (Continued) | | |

OTHER PUBLICATIONS

David Childs, Improving Employee Productivity and Efficiency, 2009, p. 52-55 (Year: 2009).*

(Continued)

*Primary Examiner* — Ibrahim N El-Bathy
(74) *Attorney, Agent, or Firm* — Global IP Counselors, LLP

(57) ABSTRACT

Systems and methods for generating reliable client billing quotes are disclosed herein. In an embodiment, a method of generating reliable client billing, quotes includes receiving a selection of a first team from a plurality of teams stored in a central memory, the first team including a plurality of members, generating a graphical user interface using team data corresponding to the first team, the graphical user interface including a quote creation table enabling entry of input data related to the plurality of members of the first team, and generating a new quote for a new client based on the input data related to the plurality of members of the first team.

13 Claims, 34 Drawing Sheets

(51) Int. Cl.
  *G06F 3/0484* (2022.01)
  *G06F 3/04842* (2022.01)
  *G06Q 10/1053* (2023.01)
  *G06Q 10/1091* (2023.01)
  *G06Q 30/0283* (2023.01)
  *G06Q 30/04* (2012.01)
  *G06Q 30/0601* (2023.01)

(52) U.S. Cl.
  CPC ..... *G06F 3/04842* (2013.01); *G06Q 10/1053* (2013.01); *G06Q 10/1091* (2013.01); *G06Q 30/0283* (2013.01); *G06Q 30/04* (2013.01); *G06Q 30/0611* (2013.01)

(58) Field of Classification Search
  CPC . G06F 3/04817; G06F 3/0484; G06F 3/04842
  See application file for complete search history.

(56) References Cited

U.S. PATENT DOCUMENTS

| | | | |
|---|---|---|---|
| 5,874,954 A | | 2/1999 | Kilmer |
| 8,219,432 B1* | | 7/2012 | Bradley .......... G06Q 10/06311 705/7.26 |
| 8,700,537 B1 | | 4/2014 | Deshpande et al. |
| 10,796,383 B2 | | 10/2020 | Shaaban et al. |
| 10,896,470 B2 | | 1/2021 | Shaaban et al. |
| 11,138,566 B2 | | 10/2021 | Shaaban et al. |
| 11,144,583 B2 | | 10/2021 | Shaaban et al. |
| 11,508,464 B1 | | 11/2022 | Fishkind |
| 2003/0046196 A1* | | 3/2003 | Kelly .................... G06Q 40/12 705/30 |
| 2004/0254859 A1 | | 12/2004 | Aslanian |
| 2007/0204211 A1 | | 8/2007 | Paxson |
| 2009/0006173 A1* | | 1/2009 | Farrell ............... G06Q 10/0639 705/7.38 |
| 2009/0077158 A1 | | 3/2009 | Riley |
| 2009/0089215 A1 | | 4/2009 | Newton |
| 2009/0099939 A1 | | 4/2009 | Thakur |
| 2009/0125454 A1 | | 5/2009 | Wartel |
| 2009/0217155 A1 | | 8/2009 | Ball |
| 2009/0240735 A1 | | 9/2009 | Grandhi |
| 2011/0173571 A1 | | 7/2011 | Nematollahi Mahani |
| 2012/0117451 A1 | | 5/2012 | You |
| 2012/0240070 A1 | | 9/2012 | Brugler |
| 2013/0231971 A1 | | 9/2013 | Bishop |
| 2014/0164028 A1 | | 6/2014 | Tran et al. |
| 2014/0195972 A1 | | 7/2014 | Lee |
| 2014/0267911 A1 | | 9/2014 | Grant |
| 2014/0365604 A1 | | 12/2014 | Lewis |
| 2015/0081485 A1 | | 3/2015 | Angelovski |
| 2016/0012373 A1* | | 1/2016 | Viswanathan ........ G06F 3/0484 705/7.42 |
| 2016/0048274 A1* | | 2/2016 | Rosenberg .......... G06F 3/04847 715/753 |
| 2016/0125511 A1 | | 5/2016 | Shaaban et al. |
| 2016/0132948 A1 | | 5/2016 | Saveliev et al. |
| 2016/0140528 A1 | | 5/2016 | Shaaban et al. |
| 2016/0203530 A1 | | 7/2016 | Shaaban et al. |
| 2016/0210572 A1 | | 7/2016 | Shaaban et al. |
| 2016/0371783 A1 | | 12/2016 | Lohrmann |
| 2017/0004550 A1 | | 1/2017 | Shaaban et al. |
| 2017/0109834 A1 | | 4/2017 | Shaaban et al. |
| 2018/0365627 A1 | | 12/2018 | Mansour |
| 2019/0066057 A1 | | 2/2019 | Shaaban et al. |
| 2019/0156385 A1 | | 5/2019 | Shaaban et al. |
| 2019/0279161 A1 | | 9/2019 | Shaaban et al. |
| 2019/0279179 A1 | | 9/2019 | Shaaban et al. |
| 2020/0126020 A1 | | 4/2020 | Nicolaisen |
| 2020/0126137 A1* | | 4/2020 | Pilkington ............. G16H 10/00 |
| 2020/0134683 A1 | | 4/2020 | Boren |
| 2021/0012290 A1 | | 1/2021 | Shaaban et al. |
| 2021/0042378 A1 | | 2/2021 | Shaaban et al. |
| 2021/0043100 A1 | | 2/2021 | Shaaban et al. |
| 2021/0049535 A1 | | 2/2021 | Shaaban et al. |
| 2021/0049714 A1 | | 2/2021 | Shaaban et al. |
| 2021/0075615 A1 | | 3/2021 | Shaaban et al. |
| 2021/0100375 A1 | | 4/2021 | Shaaban et al. |
| 2021/0150453 A1 | | 5/2021 | Ozcaglar |
| 2022/0121881 A1 | | 4/2022 | Shaaban et al. |
| 2023/0078448 A1* | | 3/2023 | Cella ................ G06Q 10/06311 |

FOREIGN PATENT DOCUMENTS

| | | |
|---|---|---|
| WO | 2016004126 A1 | 1/2016 |
| WO | 2016004127 A1 | 1/2016 |
| WO | 2016004128 A1 | 1/2016 |
| WO | 2016004129 A1 | 1/2016 |
| WO | 2016004132 A1 | 1/2016 |
| WO | 2016004133 A1 | 1/2016 |
| WO | 2016004135 A1 | 1/2016 |
| WO | 2016004138 A2 | 1/2016 |
| WO | 2016004445 A1 | 1/2016 |
| WO | 2016007334 A1 | 1/2016 |
| WO | 2016018632 A1 | 2/2016 |
| WO | 2016029194 A1 | 2/2016 |
| WO | 2018045126 A1 | 3/2018 |
| WO | 2019036310 A1 | 2/2019 |
| WO | 2022086813 A1 | 4/2022 |

OTHER PUBLICATIONS

International Search Report and Written Opinion issued Oct. 13, 2022 in corresponding International Application No. PCT/US22/31625.

International Search Report and Written Opinion issued Nov. 1, 2022 in corresponding International Application No. PCT/US22/31623.

Extended European Search Report received for EP Application No. 22877068.1, mailed on Jan. 3, 2025, 8 pages.

Furtado, Julia V., Antnio C. Moreira, and Jorge Mota. 2021. "Gender Affirmative Action and Management: A Systematic Literature Review on How Diversity and Inclusion Management Affect Gender Equity in Organizations" Behavioral Sciences 11, No. 2: 21. https://doi.org/10.3390/bs11020021 (Year: 2021).

Merriam-Webster, Rearrange, Nov. 5, 2024 from URL https://www.merriam-webster.com/dictionary/rearrange. (Year: 2024).

Office Action (Final Rejection) dated Mar. 10, 2025 for U.S. Appl. No. 17/704,833 (pp. 1-11).

Oxford English Dictionary, Rearrange, Nov. 5, 2024 from URL https://www.oed.com/dictionary/rearrange_v?tab=meaning_and_use#26876778 (Year: 2024).

Table, Dictionary.com, Apr. 29, 2024 (Year: 2024) 7 pages.

* cited by examiner

| Teams | | Corporate Innovation Team Team Members | | | | |
|---|---|---|---|---|---|---|
| Search | | Name | Title | Practice Group | Office | Current | Currency Code |
| Corporate IP Team | | | Partner | Litigation | Chicago | 650.00 | USD |
| IP Disputes | | Sean Walker | Senior Partner | Intellectual Property | Chicago | 900.00 | USD |
| Investment Team | | Charles Fisher | Mid-Level Associate 2 | Corporate | London | 563.30 | USD |
| Corporate Innovation Team | | Warren Burgess | Paralegal 1 | Firm Administration | New York | 380.00 | USD |
| McKesson Team | | | | | | | |
| Bilbrough Team | | | | | | | |
| US/UK Disputes | | | | | | | |

| Name | Title | Practice Group | Office | Current | Proposed | Adjustm... | Hours | % Alloc... | Fee Quote | CM % | |
|---|---|---|---|---|---|---|---|---|---|---|---|
| Sean Walker | Senior P... ⌄ | Intellect... ⌄ | Chicago | 900.00 | 810.00 | 10 | 18.0 | 20 | 14,580.00 USD | 19.75 | ⊗ |
| Mary Newm... | Junior A... ⌄ | Intellect... ⌄ | Chicago | 306.54 | 275.89 | 10 | 27.0 | 30 | 7,449.03 USD | 26.06 | ⊗ |
| Enter Timek... | Senior A... ⌄ | Corporate ⌄ | London | 786.00 | 707.40 | 10 | 36.0 | 40 | 25,466.40 USD | 33.29 | ⊗ |
| Enter Timek... | Paralega... ⌄ | Commer... ⌄ | San Francisco | 300.00 | 270.00 | 10 | 9.3 | 10 | 2,504.57 USD | 25.93 | ⊗ |

Gearing 4.0:1
Total Hours 90.0
Contrib. Margin % 27.90
Total Est Fees 50,000.00 USD
Total Est Disb 0.00 USD
Total Est 50,000.00 USD Matter Management

| | | | | | | | |
|---|---|---|---|---|---|---|---|
| Quote 200000091 — CN | Project Name — PN | | Matter Name — MN | Lead Partner Name — LP | | Practice Group — PG | Billing Office — BO |
| Client Name: McKesson Medical-Surgical | Demo IP | | | Sean Walker | | Intellectual Property | Chicago |
| Currency Name: US Dollar | Service Area Description — SA | | Matter Type Description — MT | Template Description — TD | | Matter Start Date — MS | Matter End Date — ME |
| Quote Due Date: 15.07.2021 — QD | | | | | | 16.07.2021 | 31.08.2021 |

My Team — 64

Effort Entry — 66

Estimate By: ○ Hours ● Fee  50,000.00      Assumptions | Allocate | 0 | % Apply  +Add Timekeeper  Disbursement | Quote Summary  ⓢ Fee Arrangments

| Name | Title | Practice Group | Office | Current | Proposed | Adjustm... | Hours | % Alloc... | Fee Quote | CM % | |
|---|---|---|---|---|---|---|---|---|---|---|---|
| Sean Walker | Senior P...⌄ | Intellect...⌄ | Chicago | 900.00 | 810.00 | 10.00 | 18.0 | 20.00 | 14,580.00 USD | 19.75 | ⊗ |
| Mary Newm... | Junior A...⌄ | Intellect...⌄ | Chicago | 306.54 | 275.89 | 10.00 | 27.0 | 30.00 | 7,449.03 USD | 26.06 | ⊗ |
| Enter Timek... | Senior A...⌄ | Corporate⌄ | London | 786.00 | 707.40 | 10.00 | 36.0 | 40.00 | 28,466.40 USD | 33.29 | ⊗ |
| Enter Timek... | Paralega...⌄ | Commer...⌄ | San Francisco | 300.00 | 270.00 | 10.00 | 9.3 | 10.00 | 2,504.57 USD | 25.93 | ⊗ |

84A, 84B, 84C, 84D

Pie chart: 10.0%, 20.0%, 30.0%, 40.0%

☐ Partner ☐ Associates ☐ SR.A

Gearing: 4.0:1
Total Hours: 90.0
Contrib. Margin %: 27.90
Total Est Fees: 50,000.00 USD
Total Est Disb: 0.00 USD
Total Est: 50,000.00 USD Download Quote | Save as New Version | Save

| | | | | Pricing Database | | | | ⊜CURO™ Q ᴄ |
|---|---|---|---|---|---|---|---|---|
| All Firm Quotes/Budgets | | Team Number of Quotes/Budgets 245 | | Total Fees Proposed 113,958,102 USD | | Unique Fee Arrangements applied 8 | | |
| Standard∨ | | | | | | Quotes or Budgets Both ∨ | | |
| Create Date: All ∨ | Area of Law All ∨ | Search ⌕ | Client | Region All ∨ | Duration: All ∨ | Fee Arrangement All ∨ | Adapt Filters (1) Go | |
| Quote/Budget | | Client | Region | Project Duration | Tags | Arrangement | Profit Margin | Fee Amount |
| Project Zero Area of Law: Foreign Investment... Created: Jun 15, 2018 | | Dana Incorporated | US | 13 Months | Assumptions (12) ☆☆☆☆☆ | Fixed Fee | Budget: 33.7% Actual: 12.7% | 164,000 USD > |
| SOLAR RIP Area of Law: Mergers & Acquisition Created: Jun 15, 2018 | | ISO TECH | EME | 16 Months | Assumptions (1) Disbursement (5) | Hourly Rates | 33.7% | 178,400 EUR > |
| IBROX arbitration Area of Law: Mergers & Acquisition Created: Jun 15, 2018 | | Rangers FC | UK | 3 Months | ☆☆☆☆☆ | Capped Fee | 33.7% | 16,000 GBP > |
| Shell v BP dispute Area of Law: Litigation Created: Jun 15, 2018 | | Shell | US | 6 Months | Risk Sharing ☆☆☆☆☆ | Capped Fee | 33.7% | 64,500 USD > |
| LNG Project Finance Area of Law: Project Finance Created: Jun 15, 2018 | | Chad Government | Africa | 11 Months | Risk Sharing | Capped Fee | 33.7% | 164,000 EUR > |

New Matters ⌄

Client:     No of Days:     Partner Role:     Partner:     Client #:

30 Days or Less ⊗    =ZL ⊗    =00000024 ⊗

Hide Filter Bar   Filters(3)   Go

Matters (1) | Default ⌄

| Client | Open Date | Matter Status | Mattercat Desc | Matter | Matter | Lead Partner Name | Matter Originator | Currency | Estimated Fees |
|---|---|---|---|---|---|---|---|---|---|
| Aron Z. Kain | 09.09.2021 | OPEN | HOURLY BILLING | Disputes | 101594.00092 | Sean Walker | | USD | 0.000 |

FIG. 31

Fees Billed ∨

Client: [Hide Filter Bar] [Filters(2)] [Go]
Partner: =Parvw: =ZL ⊗
=00000024 ⊗

Invoices (8) | Default ∨

| Client | WIP |
|---|---|
| 101594-Aron Z. Kain | 139,825 |
| 335185-Citigroup Global Markets, Inc. [Click to Deselect] | 75,068 |
| 340962-Green, Jeff | 98,159 |
| 342727-Alice + Olivia, LLC | 24,124 |
| 385959-Alex and Ani | 29,236 |
| 394845-Remedios Hester | 81,180 |
| 398918-New gen Insurance | 42,692 |
| 6-A Bilborough & Co | 259,042 |
| | 749,326 |

Matter Listing - balances in matter currency (3) | Default ∨

| Payer | Lead Partner | Matter Code | Matter | Currency | WIP hours | WIP |
|---|---|---|---|---|---|---|
| Citigroup... | Sean Walker | 335185.00012 | Citi TEBS | USD | 124.20 | 75,068 |
| Citigroup... | Sean Walker | 335185.00053 | 4000 Benning Road | USD | 0.00 | 0 |
| Citigroup... | Sean Walker | 335185.00104 | Wayne Hills | USD | 0.00 | 0 |
| | | | | | 124.20 | 75,068 |

| | | |
|---|---|---|
| 8 < 🏠 | | Matter Management ∨ |
| My Quotes (7) | + Create Quote | Quote Detail |
| Search | 🔍 | |

🔄 RESEARCH

| | | |
|---|---|---|
| 28.05.2021 | 50,000.00 USD | |
| 200000084  Client Requested F... | | |
| JP Industries LLP | | |
| 09.07.2021 | 195,060.00 GBP | |
| 200000080  Submitted for Review | | |
| PNC Bank | | |
| 15.07.2021 | 50,000.00 USD | |
| 200000091  Quote Ready For Edit | | |
| McKesson Medical-Surgical | | |
| 30.07.2021 | 295,000.00 GBP | |
| 200000085  Quote Ready For Edit | | |
| SNP STOCK | | |
| 06.08.2021 | 100,000.00 USD | |

📋 Summary    📎 Attachments (0)    ⊞ Quote Detail

Quote Details

| | | Fee Arrangement | |
|---|---|---|---|
| Quote: | 200000080 | Fee Type: | Fixed Fee |
| Status: | Submitted for Review | Currency: | British Pound |
| Client: | PNC Bank | Estimated Fees: | 150,000.00 |
| Matter: | | Disbursements: | 5,000.00 |
| Project: | UK operations contracts | Discount / Premium Amount: | (45,060.00) |
| Billing Office: | London | Discount / Premium %: | (23.1) |
| Lead Partner: | Simon Bell | Realization %: | 76.90 |
| PracticeGroup: | Corporate | Contrib. Margin %: | 18.98 |
| Service Area: | Corporate | Gearing: | 3.6:1 |
| Matter Type: | Commercial Contracts | | |

[Enter comments here]

👤 Kofi Mundy - Castle: Simon trying to get in with the client with heavily discounted approach - approval board are supportive
12.07.2021, 20:49:45

⬇ Download Comments    ✓ Approved    ✏ Submit For Review

FIG. 34

SYSTEMS AND METHODS FOR GENERATING RELIABLE CLIENT BILLING QUOTES BASED ON A TEAM INCLUDING A PLURALITY OF MEMBERS

PRIORITY

This application claims priority to U.S. Provisional Application No. 63/250,388, filed Sep. 30, 2021, entitled "Systems and Methods for Generating Reliable Client Billing Quotes", the entire contents of which is incorporated herein by reference and relied upon.

BACKGROUND

Technical Field

This disclosure generally relates to systems and methods for generating reliable client billing quotes.

Background Information

Many companies obtain new business by providing current or potential clients with quotes for the work to be performed. This can be particularly time consuming and speculative for companies that bill by the hour for a wide variety of workers with different billing rates, such as consulting firms, law firms, accounting firms, etc. This can also consume significant processing resources and result in data storage redundancies when a significant number of workers and clients are involved.

SUMMARY

It has been discovered that new systems and methods for generating reliable client billing quotes are desired, particularly new systems and methods which improve the user experience, increase reliability, optimize processing, and conserve memory space.

A first aspect of the present disclosure is to provide a system for generating reliable client billing quotes. The system includes a plurality of user terminals, at least one memory, and at least one processor. The plurality of user terminals each includes a user input device. The plurality of user terminals includes at least a first user terminal corresponding to a first user and a second user terminal corresponding to a second user. The at least one memory is configured to store team data corresponding to a plurality of teams, each team having a plurality of members. The at least one processor is programmed to: (i) generate a first graphical user interface on the first user terminal that enables the first user to select a first team from the plurality of teams, the second user being a member of the first team; (ii) generate a second user interface on the first user terminal using the team data corresponding to the first team, the second graphical user interface including a quote creation table enabling the entry of input data related to the plurality of members of the first team including the second user; (iii) generate a new quote for a new client based on the input data related to the plurality of members of the first team; and (iv) send a notification to the second user terminal of the second user regarding the new quote.

A second aspect of the present disclosure is to provide another system for generating reliable client billing quotes. The system includes at least one memory and at least one processor. The at least one memory is configured to store team data corresponding to a plurality of teams, each team having a plurality of members. The at least one processor is programmed to: (i) enable selection of a first team from the plurality of teams; (ii) generate a graphical user interface using the team data corresponding to the first team, the graphical user interface including a quote creation table enabling the entry of input data related to the plurality of members of the first team; (iii) and generate a new quote for a new client based on the input data related to the plurality of members of the first team.

A third aspect of the present disclosure is to provide another system for generating reliable client billing quotes. The system includes a plurality of user terminals, at least one memory, and at least one processor. The plurality of user terminals each includes a user input device. The plurality of user terminals includes at least a first user terminal corresponding to a first user and a second user terminal corresponding to a second user. The at least one memory is configured to store quote data corresponding to a plurality of quotes created by the first user or the second user. The at least one processor is programmed to: (i) generate a first graphical user interface on at least one of the first user terminal and the second user terminal, the first graphical user interface including a plurality of first icons, a plurality of second icons, and a workflow table; (ii) upon selection of one of the plurality of first icons using the first graphical user interface, regenerate the workflow table in a same location on the first graphical user interface without adjusting the plurality of first icons or the plurality of second icons; (iii) enable selection of at least one of the plurality of quotes from within the regenerated workflow table; and (iv) upon selection of one of the plurality of second icons by at least one of the first user and the second user using the first graphical user interface, generate a second graphical user interface on the first user terminal that is related to the selected at least one of the plurality of quotes.

A fourth aspect of the present disclosure is to provide another system for generating reliable client billing quotes. The system includes at least one memory and at least one processor. The at least one memory is configured to store quote data corresponding to a plurality of quotes. The at least one processor programmed to: (i) generate a first graphical user interface including a plurality of first icons, a plurality of second icons, and a workflow table; (ii) upon selection of one of the plurality of first icons by a first user using the first graphical user interface, regenerate the workflow table in the same location on the first graphical user interface without adjusting the plurality of first icons or the plurality of second icons; (iii) enable the first user to select at least one of the plurality of quotes from within the regenerated workflow table; and (iv) upon selection of one of the plurality of second icons by the first user using the first graphical user interface, generate a second graphical user interface that is related to the selected at least one of the plurality of quotes.

A fifth aspect of the present disclosure is to provide a method of generating reliable client billing quotes. The method includes generating a first graphical user interface on a first user terminal that enables a first user to select a first team from a plurality of teams stored in a central memory, the first team including a plurality of members including a second user, generating a second user interface on the first user terminal using team data corresponding to the first team, the second graphical user interface including a quote creation table enabling the entry of input data related to the plurality of members of the first team, generating a new quote for a new client based on the input data related to the plurality of members of the first team, and sending a notification to a second user terminal of the second user regarding the new quote.

A sixth aspect of the present disclosure is to provide another method of generating reliable client billing quotes. The method includes receiving a selection of a first team from a plurality of teams stored in a central memory, the first team including a plurality of members, generating a graphical user interface using team data corresponding to the first team, the graphical user interface including a quote creation table enabling entry of input data related to the plurality of members of the first team, and generating a new quote for a new client based on the input data related to the plurality of members of the first team.

A seventh aspect of the present disclosure is to provide another method of generating reliable client billing quotes. The method includes generating a first graphical user interface including a plurality of first icons, a plurality of second icons, and a workflow table, upon selection of one of the plurality of first icons using the first graphical user interface, regenerating the workflow table in a same location on the first graphical user interface without adjusting the plurality of first icons or the plurality of second icons, enabling selection of at least one of the plurality of quotes from within the regenerated workflow table, and upon selection of one of the plurality of second icons using the first graphical user interface, generating a second graphical user interface on the first user terminal that is related to the selected at least one of the plurality of quotes.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure:

FIGS. 3 to 34 illustrate various example embodiments of user interfaces generated by the system of FIG. 1 in accordance with the methods discussed herein.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
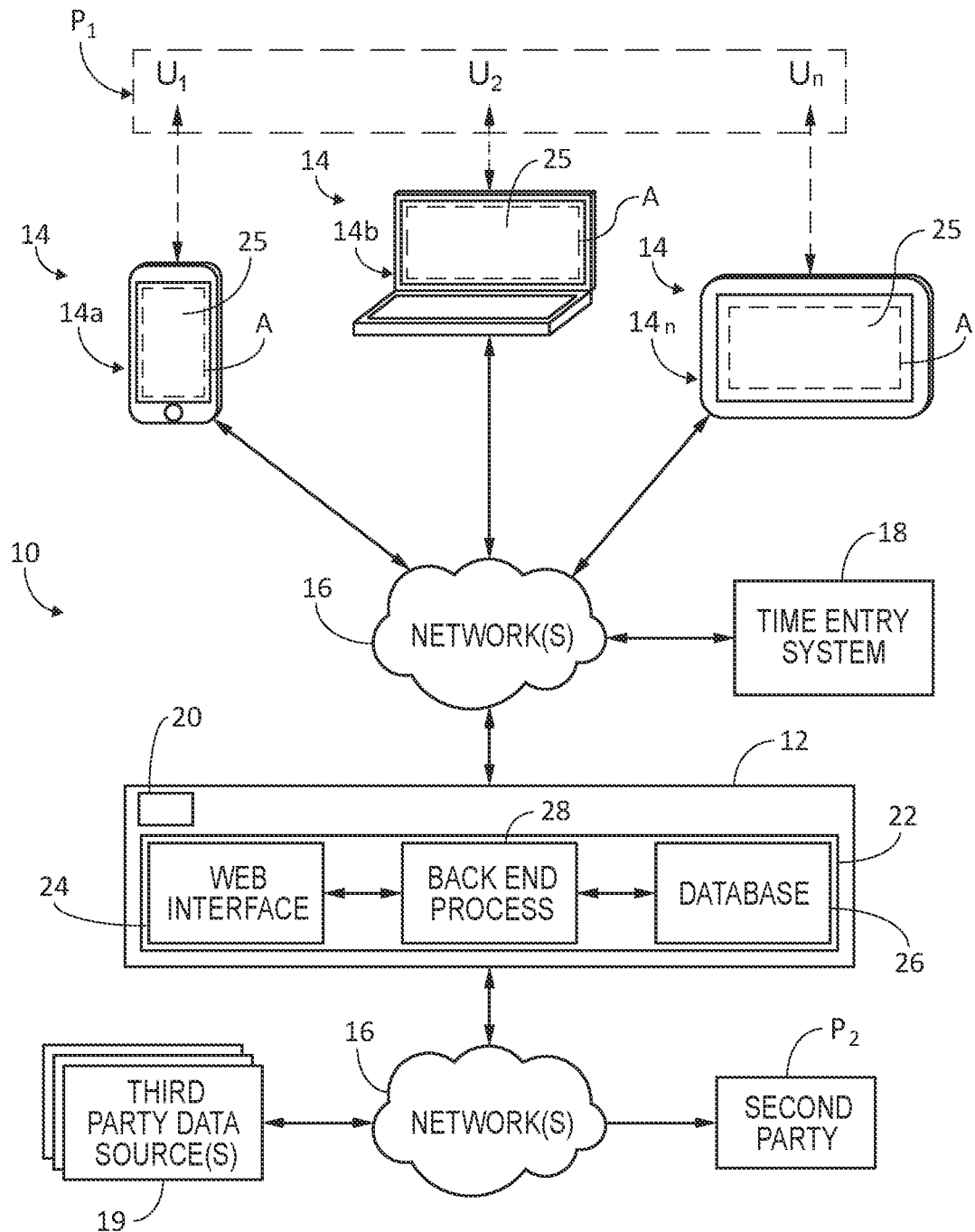
FIG. 1 illustrates an example embodiment of a system for generating reliable client billing quotes in accordance with the present disclosure.

FIG. 1 illustrates an example embodiment of a system 10 for generating reliable client billing quotes. In the illustrated embodiment, the system 10 includes a central server 12 and one or more user terminals 14 operated by one or more users $U_1, U_2 \ldots U_n$ of a first party $P_1$. In use, the central server 12 is configured to wirelessly communicate with each of the user terminals 14 via a network 16. In an embodiment, the central server 12 is also configured to wirelessly communicate with one or more client for whom the quote is being generated. The one or more clients are also referred to herein as second parties $P_2$.

Each of the plurality of user terminals 14 can be, for example, a cellular phone, a tablet, a personal computer, a smart watch, or another electronic device. Here, the plurality of user terminals 14 includes a first user terminal 14a, a second user terminal 14b, and an nth user terminal 14n. Each user terminal 14 can be controlled by a distinct user $U_1, U_2 \ldots U_n$ (e.g., a first user $U_1$ controls the first user terminal 14a, a second user $U_2$ controls the second user terminal 14b, and an nth user $U_n$ controls the nth user terminal 14n). The user $U_1, U_2 \ldots U_n$ of each user terminal 14 can be, for example, a member or employee of the first party $P_1$. As used herein, each of the users $U_1, U_2 \ldots U_n$ can also be referred to generally as a user U. In an embodiment, the first party $P_1$ can be any business that uses timed billing rates (e.g., hourly time entries) to bill clients, such as a consulting firm, a law firm, an accounting firm, or a similar business.

The first party $P_1$ includes a plurality of users $U_1, U_2 \ldots U_n$. Although a single first party $P_1$ and a single second party $P_2$ are discussed herein for simplicity, it should be understood from this disclosure that the system 10 can operate to support any number of such parties and significantly improves processing efficiency and decreases time spent and memory storage needed as the number of users U, first parties $P_1$ and/or second parties $P_2$ increases.

The system 10 is configured to access various data sources. As seen in FIG. 1, the system 10 is configured to access a time entry system 18 and/or a third party data source 19. The time entry system 18 can include a database controlled by the first party $P_1$ using the system 10, for example, an existing time entry system 18 which is used by each of the users U of the first party $P_1$ to record time entries which are then used for billing purposes. In an embodiment, the time entry system 18 includes the time entry system described in U.S. Provisional Application No. 63/235,187, entitled "Systems and Methods for Time Entry, Management and Billing," the entire contents of which is incorporated herein by reference. The third party data source 19 can include one or more data source which is controlled by a third party and accessed by the central server 12 via the network 16, for example, a website controlled by a third party. In an embodiment, the third party data source 19 is accessible by the system 10 via a public website. In an embodiment, the system 10 is also configured to send data directly to and/or receive data directly from the second party $P_2$ via the network 16.

The user terminals 14 can communicate with the central server 12 via various communication protocols, for example, via an Internet Protocol Suite or TCP/IP supporting HTTP. The network 16 can comprise a public network (e.g., the Internet, World Wide Web, etc.), a private network (e.g., local area network (LAN), etc.), and/or combinations thereof (e.g., a virtual private network, LAN connected to the Internet, etc.). The network 16 can include a wired network, a wireless network, and/or a combination of the two.

The central server 12 can comprise one or more server computers, database servers and/or other types of computing devices, particularly in connection with, for example, the implementation of websites and/or enterprise software. The central server 12 can further comprise a central processor 20 and a central memory 22. The central processor 20 is configured to execute instructions programmed into and/or stored by the central memory 22. In an embodiment, the central processor 20 can comprise one or more of a microprocessor, microcontroller, digital signal processor, co-processor or the like or combinations thereof capable of executing stored instructions and operating upon stored data, wherein the instructions and/or data are stored by the central memory 22. The central memory 22 can comprise one or more devices such as volatile or nonvolatile memory, for example, random access memory (RAM) or read only memory (ROM). Further, the central memory 22 can be embodied in a variety of forms, such as a hard drive, optical disc drive, floppy disc drive, etc. In an embodiment, the steps of the methods described herein are stored as instructions in the central memory 22 and executed by the central processor 20.

In the illustrated embodiment, the central memory 22 includes a web interface 24, a database 26, and back end processing instructions 28. Here, the web interface 24, the database 26, and the back end processing instructions 28 can be controlled or accessed by the central processor 20 implementing appropriate software programs by executing the back end processing instructions 28 or other instructions programmed into and/or stored by the central memory 22.

The web interface 24 is configured to provide a graphical user interface ("GUI") 25 that can be displayed on a terminal 14 for a user U, and is configured to manage the transfer of data received from and sent to the GUI 25 on the terminal 14. For example, the GUI 25 can be employed by a user U to provide input data to the central server 12 for the generation of a quote for a second party $P_2$. In an embodiment, each user terminal 14 includes an application A comprising software downloaded to and executed by the user terminal 14 to provide the GUI 25 and to manage communications with the central server 12. The application A can be downloaded to the user terminal 14 from the central server 12 or from some other source such as an application distribution platform. In an embodiment, the application A can also be viewed via a web browser.

The database 26 is configured to store data related to current or previous quotes. The data can include input data, team data and/or other data discussed herein. The database 26 is also configured to store data relevant to the second party $P_2$, as well as data retrieved from the second party $P_2$, a time entry system 18, and/or a third party data source 19. In an embodiment, the database 26 comprises a database management system (DBMS) operating on one or more suitable database server computers. The database 26 can also comprise storage components from other systems, such as a time entry system 18 having relevant data concerning already stored therein. In an embodiment, the same database 26 is used for the system 10 and the time entry system 18. The database 26 can be further configured to store editable rules regarding generation of each respective GUI 25 for one or more user terminal 14.

The back end processing instructions 28 can be operatively coupled to both the web interface 24 and the database 26, and can be programmed into and/or stored by the central memory 22 and implemented by the central processor 20. In an embodiment, the back end processing instructions 28 can be executed by the central processor 20 to direct operations of the central server 12 as described below in further detail. For example, the central processor 20, executing the back end processing instructions 28, can manage the receipt, storage, enhancement, maintenance, etc. of relevant data (e.g., input data, team data and/or other data received from one or more user U of the first party $P_1$ via a terminal 14). Additionally, the central processor 20, executing the back end processing instructions 28, can develop and enhance similar relevant data based on information obtained from the second party $P_2$, a time entry system 18, and/or a third party data source 19, as well as further functions discussed in more detail below.

Figure 2:
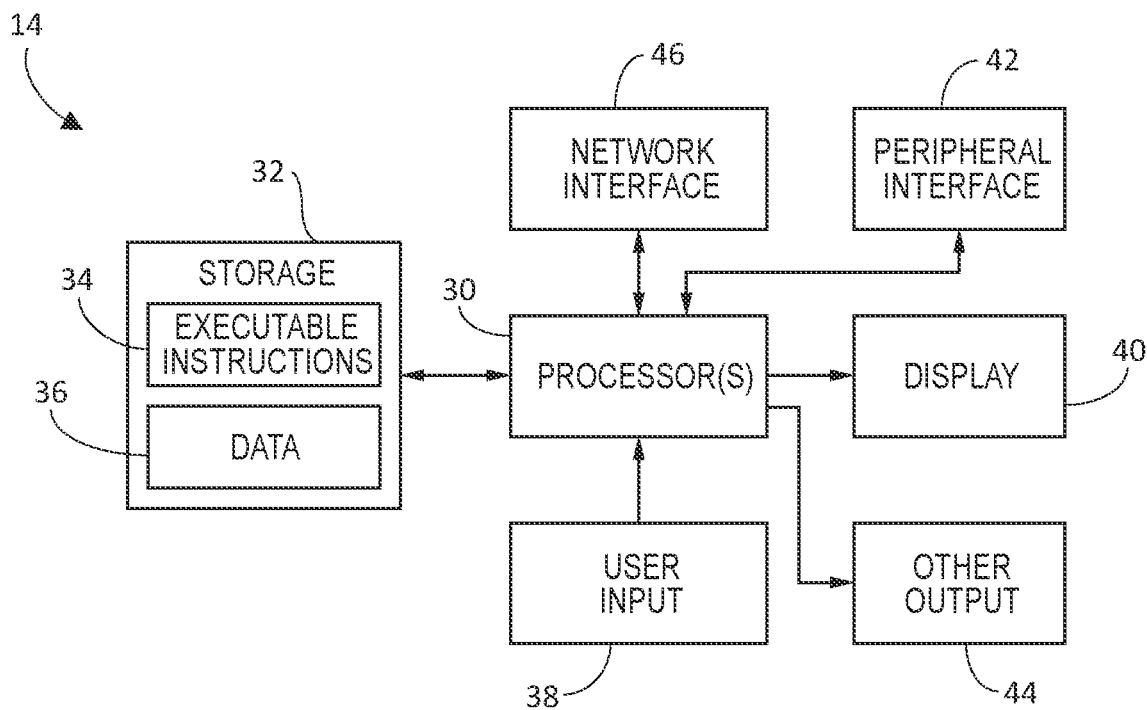
FIG. 2 is a representative diagram of an example embodiment of a user terminal which can be used in the system of FIG. 1.

FIG. 2. illustrates a representative diagram of an example embodiment of a user terminal 14. As illustrated, a user terminal 14 can include a terminal processor 30 and a terminal memory 32. The terminal processor 30 is configured to execute instructions programmed into and/or stored by the terminal memory 32. The instructions can be received from and/or periodically updated by the web interface 24 of the central server 12 in accordance with the methods discussed herein. In an embodiment, the methods described. herein are stored as instructions in the terminal memory 32 and executed by the terminal processor 30.

In an embodiment, the terminal processor 30 can comprise one or more of a microprocessor, microcontroller, digital signal processor, co-processor or the like or combinations thereof capable of executing stored instructions 34 and operating upon stored data 36, wherein the instructions 34 and/or stored data 36 are stored by the terminal memory 32. The terminal memory 32 can comprise one or more devices such as volatile or nonvolatile memory, for example, random access memory (RAM) or read only memory (ROM). Further, the terminal memory 32 can be embodied in a variety of forms, such as a hard drive, optical disc drive, floppy disc drive, etc. In an embodiment, many of the processing techniques described herein are implemented as a combination of executable instructions 34 and data 36 stored within the terminal memory 32.

As illustrated, each of the plurality of user terminals 14 includes one or more user input device 38, a display 40, a peripheral interface 42, one or more other output device 44, and a network interface 46 in communication with the terminal processor 30. The user input device 38 can include any mechanism for providing a user input to the terminal processor 30, for example, a keyboard, a mouse, a touch screen, a microphone and/or suitable voice recognition application, or another input mechanism. The display 40 can include any conventional display mechanism such as a cathode ray tube (CRT), a flat panel display, a touch screen, or another display mechanism. Thus, as can be understood, the user input device 38 and/or the display 40 and/or any other suitable element can be considered a GUI 25. The peripheral interface 42 can include the hardware, firmware, and/or other software necessary for communication with various peripheral devices, such as media drives (e.g., magnetic disk or optical disk drives), other processing devices, or another input source used as described herein. Likewise, the other output device 44 can optionally include similar media drive mechanisms, other processing devices or other output destinations capable of providing information to a user of the user terminal 14, such as speakers, LEDs, tactile outputs, etc. The network interface 46 can comprise hardware, firmware and/or software that allows the terminal processor 30 to communicate with other devices via wired or wireless networks 16, whether local or wide area, private or public. For example, such networks 16 can include the World Wide Web or Internet, or private enterprise networks, or the like.

While the user terminal 14 has been described as one form for implementing the techniques described herein, those having ordinary skill in the art will appreciate from this disclosure that other functionally equivalent techniques can be employed. For example, some or all of the functionality implemented via executable instructions can also be implemented using firmware and/or hardware devices such as application specific integrated circuits (ASICs), programmable logic arrays, state machines, etc. Further, other implementations of the user terminal 14 can include a greater or lesser numbers of components than those illustrated. Further still, although a single user terminal 14 is illustrated in FIG. 2, it should be understood from this disclosure that a combination of such devices can be configured to operate in conjunction (for example, using known networking techniques) to implement the methods described herein.

FIGS. 3 to 34 illustrated various GUIs 25 which are generated at one or more user terminal 14 in accordance with the methods described herein. It should be understood by those of ordinary skill in the art from this disclosure that the disclosed GUIs 25 improve the user experience, conserve user time, and prevent errors in generated quotes, while the system 10 as a whole achieves improved processing efficiency and memory storage via the data enhancement methods used to generate these GUIs 25 and the corresponding quotes.

Figure 3:
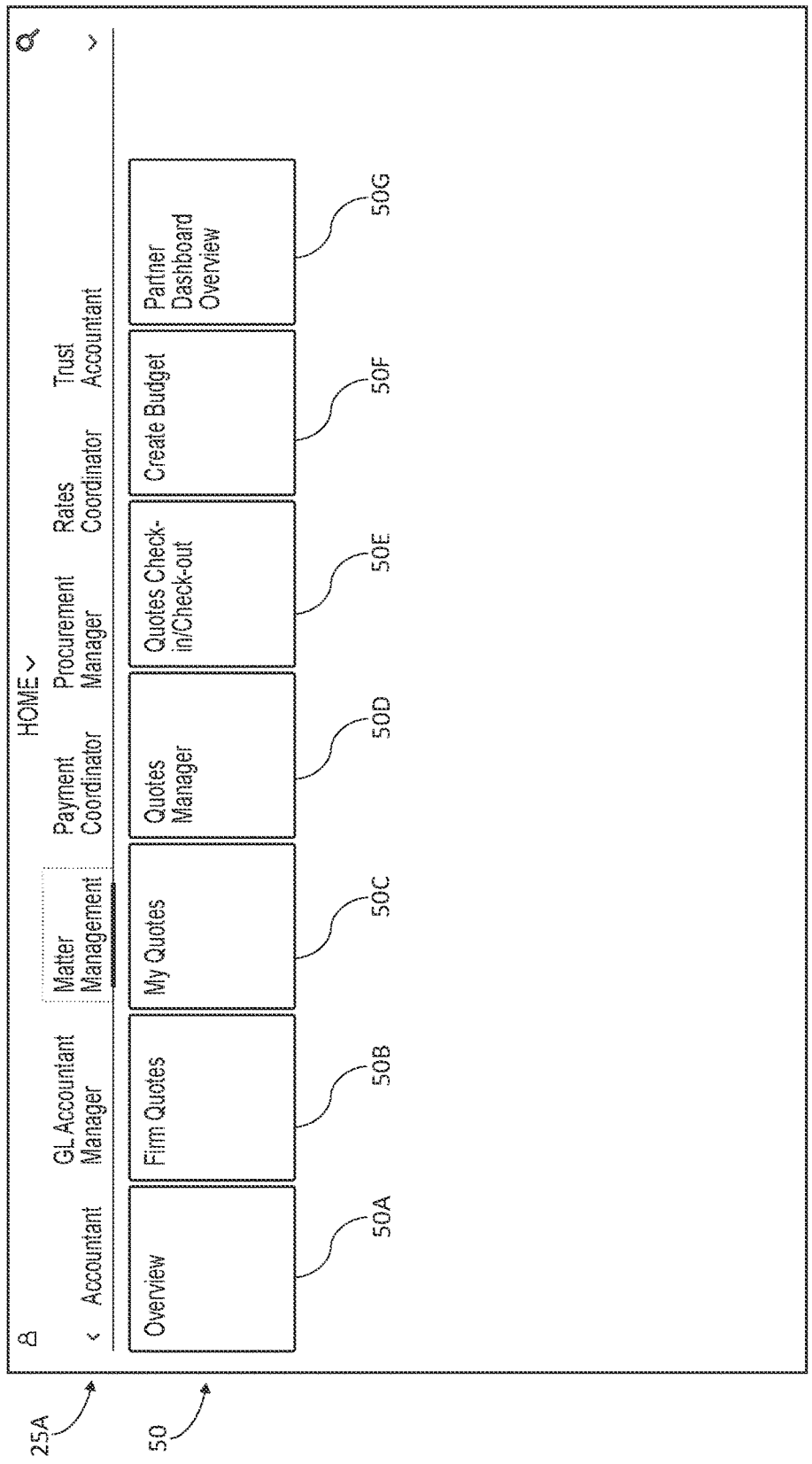

FIG. 3 illustrates an example embodiment of a first GUI 25A displayed on a user terminal 14 (e.g., a first user terminal 14a) for a user U (e.g., a first user $U_1$) in accordance with the present disclosure. The first GUI 25A is a home screen configured to display a summary of options for the user U. In the illustrated embodiment, the first GUI 25A includes a plurality of icons 50 that can be selected by the user U. In this embodiment, the plurality of icons 50 includes an overview icon 50A, a firm-quotes icon 50B, a my-quotes icon 50C, a quotes-manager icon 50D, a check-in/check-out icon 50E, a create-budget icon 50F, and a partner-dashboard icon 50G. In an embodiment, the system 10 enables rearrangement and/or deletion of the icons 50 based on the icons 50 that are used most by the user U. In an embodiment the system 10 is configured to automatically rearrange the icons based on a detected number of selections by the user U. Those of ordinary skill in the art will recognize from this disclosure that there are a variety of icons and arrangements which can be used instead of and/or in addition to the arrangement shown by the first GUI 25A.

Figure 4:
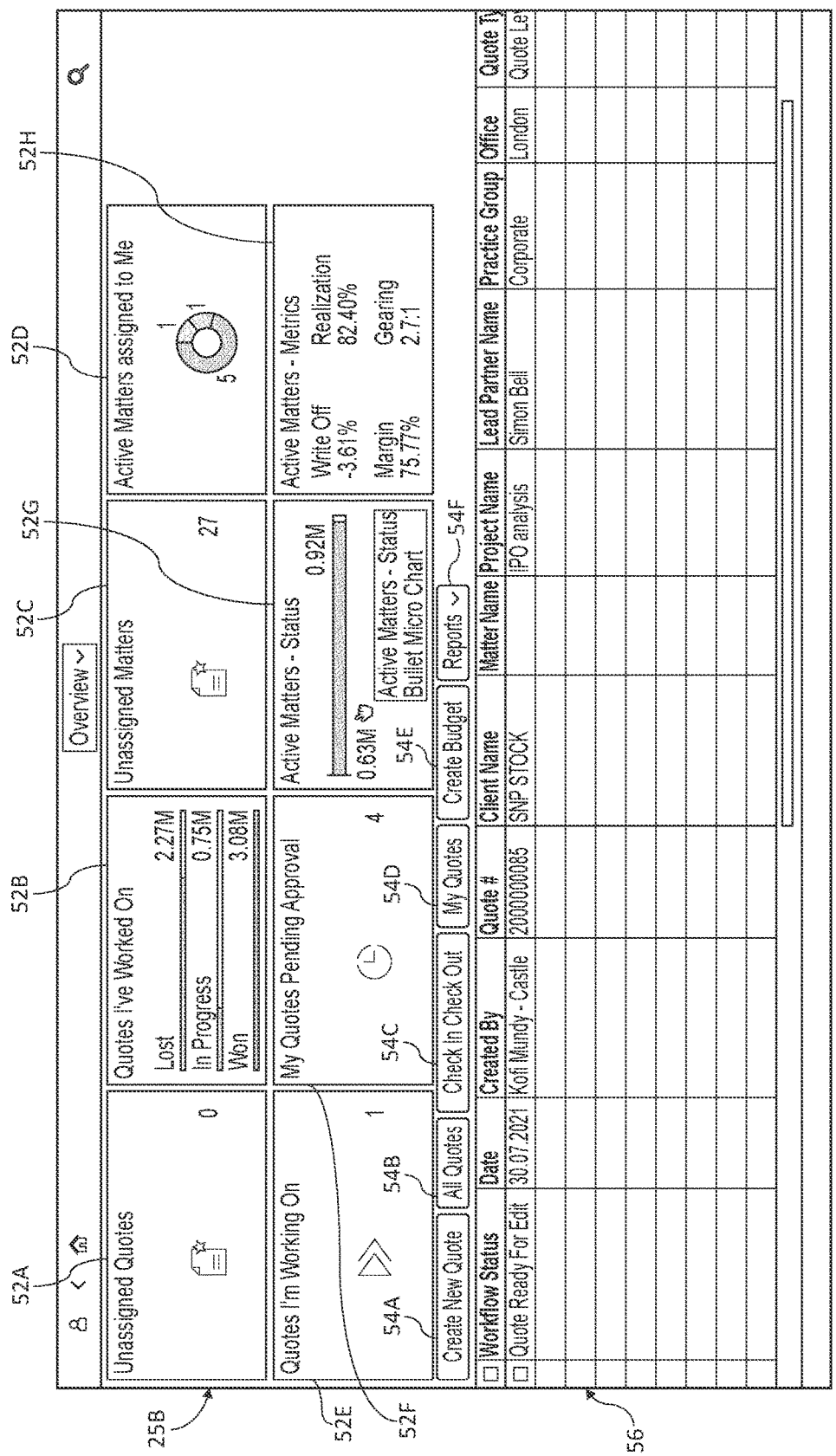

FIG. 4 illustrates an example embodiment of a second GUI 25B displayed on a user terminal 14 (e.g., a first user terminal 14a) for a user U (e.g., a first user $U_1$) in accordance with the present disclosure. In the illustrated embodiment, the system 10 automatically triggers generation of the second GUI 25B when a user U selects the overview tile 50A of the first GUI 25A. In the illustrated embodiment, the second GUI 25B includes a plurality of first icons 52 that can be selected by the user U. The plurality of first icons 52 includes an unassigned-quotes icon 52A, a worked-quotes icon 52B, an unassigned-matters icon 52C, an active-matters icon 52D, an active-quotes icon 52E, a pending-quotes icon 52F, an active-status icon 52G, and an active-metrics icon 52H. In the illustrated embodiment, the second GUI 25B further includes a plurality of second icons 54. The plurality of second icons 54 includes a new-quote icon 54A, an all-quotes icon 54B, a check-in/out icon 54C, a my-quotes icon 54D, a create-budget icon 54E, and a reports icon 54F. In the illustrated embodiment, the second GUI 25B also includes a workflow table 56, which is adjusted based on the first icon 52 and/or second icon 54 selected by the user U.

The second GUI 25B is advantageous, for example, due to the positioning of the icons 52 on the same GUI 25 as the workflow table 56 and the automatic regeneration of the workflow table 56 based on a selected first icon 52. This improves processing efficiency as the same GUI is used to quickly and easily regenerate the workflow table 56 without rearrangement of the icons 52 or workflow table 56, using minimal processing to provide the user U with the desired quote data and further enabling the user U to quickly regenerate the workflow table 56 as needed and/or create a new quote based thereon.

In the illustrated embodiment, one or more of the plurality of first icons 52 triggers automatic regeneration of the workflow table 56. For example, in the illustrated embodiment, selection of the unassigned-quotes icon 52A triggers regeneration of the workflow table 56 with all previously generated but still unassigned quotes; selection of the worked-quotes icon 52B triggers regeneration of the workflow table 56 with all quotes that the user U has previously worked on (e.g., created, edited, etc.); selection of the unassigned-matters icon 52C triggers regeneration of the workflow table 56 with all quotes that have not yet been assigned (e.g., assigned to a particular matter, second party $P_2$, or lead partner); selection of the active-matters icon 52D triggers regeneration of the workflow table 56 with all quotes that are currently/actively assigned to the user U and/or attached to a matter or lead partner; selection of the active-quotes icon 52E triggers regeneration of the workflow table 56 with all quotes that the user U is in the process of generating but that have not been completed and/or attached to a matter or lead partner; selection of the pending-quotes icon 52F triggers regeneration of the workflow table 56 with all quotes that have been completed and are awaiting approval (e.g., approval from the lead partner); selection of the active-status icon 52G triggers regeneration of the workflow table 56 with all quotes that are current/active (e.g., as with the active-matters icon 52D); selection of the active-metrics icon 52H triggers regeneration of the workflow table 56 with all quotes that are current/active (e.g., as with the active-matters icon 52D). In an embodiment the system 10 is configured to automatically rearrange the first icons 52 based on a detected number of selections by the user U.

In the illustrated embodiment, each of the plurality of second icons 54 triggers a system function. For example, selection of the new-quote icon 54A triggers the generation of a new GUI 25 for creating a new quote; selection of the all-quotes icon 54B triggers generation of a new GUI 25 with all quotes currently stored by the system 10, which can then be filtered according to various criteria; selection of the check-in/out icon 54C triggers the generation of a new GUI 25 for editing a selected quote; selection of the my-quotes icon 54D triggers the generation of a new GUI 25 including the quotes created by the user U; selection of the create-budget icon 54E, triggers the generation of a GUI 25 which enables the user U to create a new budget using an existing quote or from scratch, for example, the twelfth GUI 25L shown in FIG. 23; and selection of the reports-icon 54F triggers the generation of a new GUI 25 for one of a plurality of reports which display various data from a plurality of previously created quotes.

The workflow table 56 displays summary data for one or more quotes based on selected criteria. In the illustrated embodiment, the system generates a new workflow table 56 based on the first icon 52 selected by the user U. In the illustrated embodiment, the user U has selected the active-matters-status icon 52G, which has triggered the generation of a workflow table 56 including active matters (e.g., in FIG. 4, only one active matter exists). The user U can then select a quote listed in the workflow table 56 and perform further processing by selecting a second icon 54.

Figure 5:
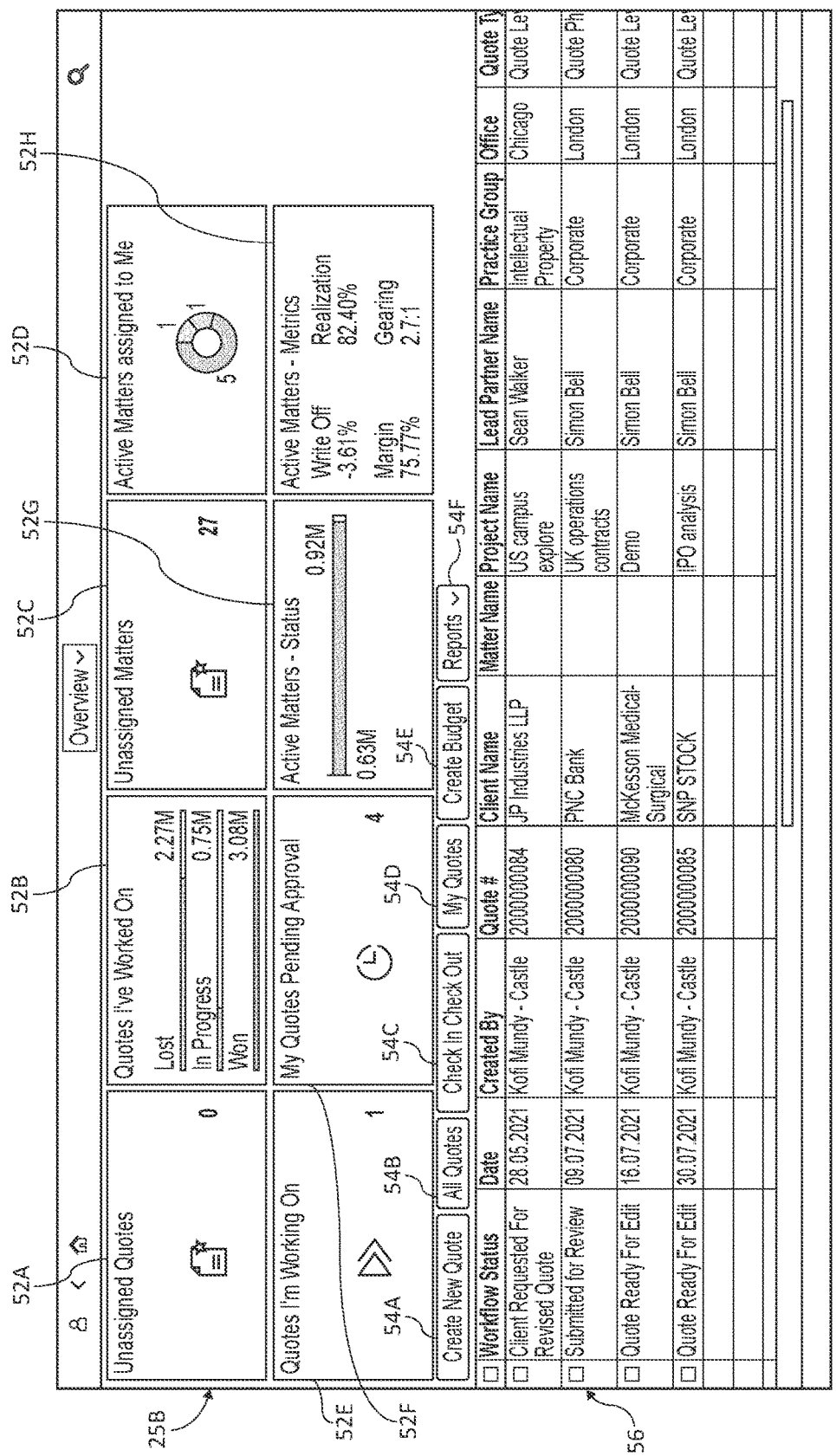

FIG. 5 illustrates the second GUI 25B after the user U has selected the pending-quotes icon 52F. The selection of the pending-quotes icon 52F has triggered the generation of a workflow table 56 including pending quotes using minimal processing, while at the same time holding the workflow table 56 in a constant position in comparison to FIG. 4. In this way the user U can quickly and easily view and access desired information without relocating his or her attention or generating a new GUI. In an embodiment, the new workflow table 56 is hot swapped into the second GUI 25B without affecting any of the other first icons 52 and/or second icons 54 and without causing regeneration of the second GUI 25B. In this way the system 10 conserves processing power that would otherwise be dedicated to regeneration of the second GUI 25B.

Figure 6:
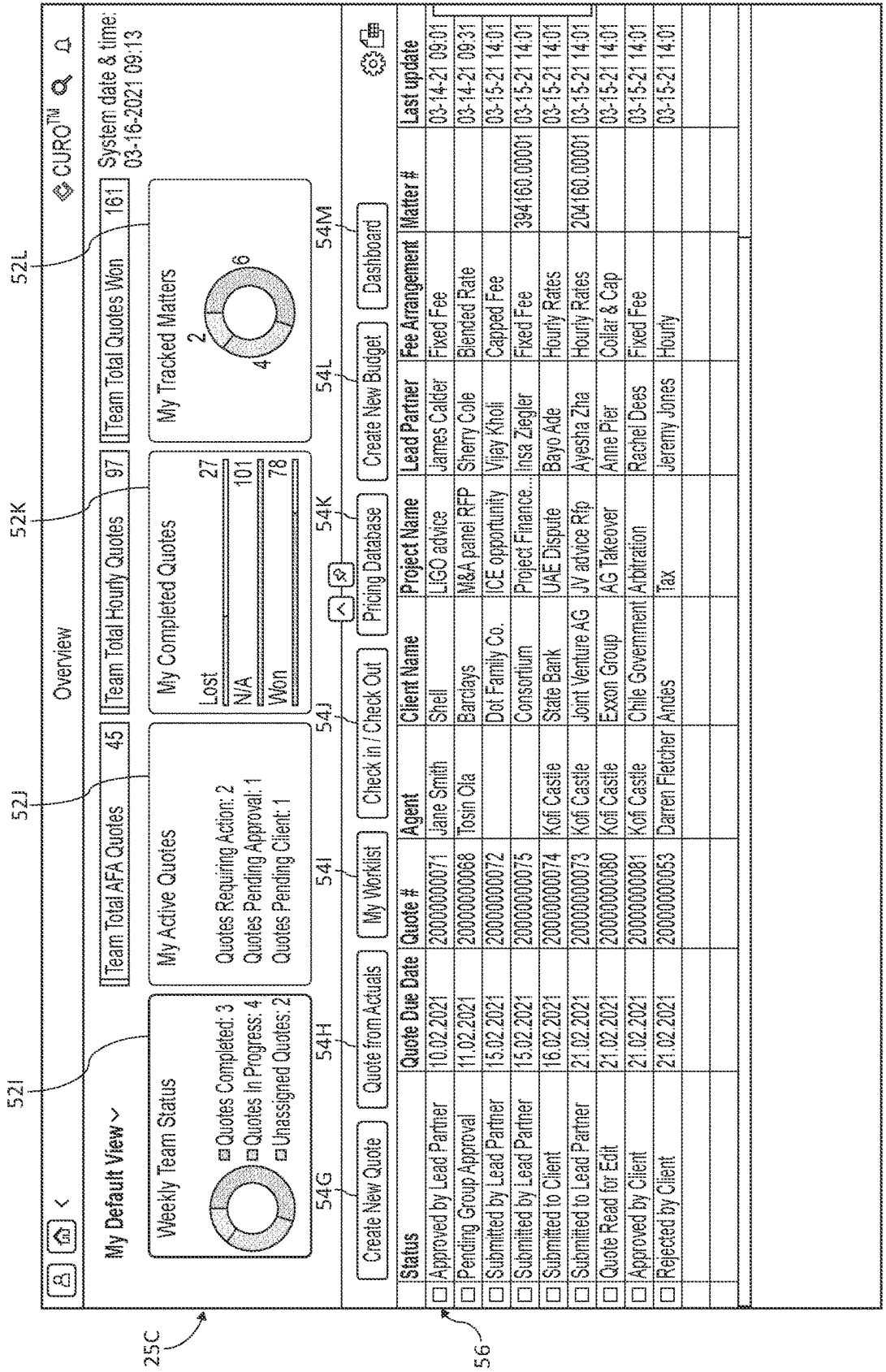

FIG. 6 illustrates an example embodiment of a third GUI 25C displayed on a user terminal 14 (e.g., a first user terminal 14*a*) for a user U (e.g., a first user $U_1$) in accordance with the present disclosure. Here, the third GUI 25C is an alternative embodiment of the second GUI 25B containing many of the same or similar elements. In an embodiment, the system 10 automatically triggers generation of the third GUI 25C when a user U selects the overview tile 50A of the first GUI 25A. In the illustrated embodiment, the third GUI 25B includes a plurality of first icons 52 that can be selected by the user U. The plurality of first icons 52 includes a weekly-status icon 52I, an active-quotes icon 52J, a completed-quotes icon 52K, and a tracked-matters icon 52L. In the illustrated embodiment, the second GUI 25B further includes a plurality of second icons 54. The plurality of second icons 54 includes a new-quote icon 54G, a quotes-from-actual s icon 54H, a worklist icon 54I, a check-in/out icon 54J, a pricing-database icon 54K, a create-budget icon 54L, and a dashboard icon 54M. In the illustrated embodiment, the second GUI 25B also includes a workflow table 56, which is adjusted based on the first icon 52 and/or second icon 54 selected by the user U.

Like the second GUI 25B, the third GUI 25C is advantageous, for example, due to the positioning of the first icons 52 on the same GUI as the workflow table 56 and the automatic regeneration of the workflow table 56 based on a selected first icon 52. This improves processing efficiency as the same GUI is used to quickly and easily provide regenerated workflow table 56 without rearrangement of the icons 52 or workflow table 56, using minimal processing to provide the user U with the desired quote data and further enabling the user U to quickly regenerate the workflow table 56 as needed.

In the illustrated embodiment, one or more of the plurality of first icons 52 causes regeneration of the workflow table 56. For example, in the illustrated embodiment, the weekly-status icon 52I has been selected. Selection of the weekly-status icon 52I has triggered regeneration of the workflow table 56 with all quotes from the current week. Similarly, selection of the active-quotes icon 52J triggers regeneration of the workflow table 56 with all active quotes; selection of the completed-quotes icon 52K triggers regeneration of the workflow table 56 with all completed quotes; and selection of the tracked-matters icon 52L triggers regeneration of the workflow table 56 with all matters that the user U and/or system 10 has previously identified to be tracked.

In the illustrated embodiment, each of the plurality of icons 50 provides an individual function. For example, selection of the new-quote icon 54G triggers the generation of a new GUI 25 for creating a new quote; selection of the quotes-from-actuals icon 54H triggers the generation of a new GUI 25 for creating a new quote using the basic parameters of a preexisting matter; selection of worklist icon 54I triggers the generation of a new GUI 25 including quotes worked on by the user U; selection of the check-in/out icon 54J triggers 54C triggers the generation of a new GUI 25 for editing a selected quote; selection of the pricing-database icon 54K triggers the generation of the fourteenth GUI 25N shown in FIG. 25; selection of the create-budget icon 54L triggers the generation of a GUI 25 which enables the user U to create a new budget using an existing quote or from scratch, for example, the twelfth GUI 25L shown in FIG. 23; and selection of the dashboard icon 54M triggers the generation of the thirteenth GUI 25M shown in FIG. 24.

The workflow table 56 displays summary data for one or more quotes based on selected criteria. In the illustrated embodiment, the system 10 generates a new workflow table 56 based on the first icon 52 selected by the user U. In the illustrated embodiment, the user U has selected the weekly-status icon 52I, which has triggered the generation of a workflow table 56 including all quotes from the current week. The user U can then select a quote listed in the workflow table 56 and perform further processing by selecting a second icon 54.

Figure 7:
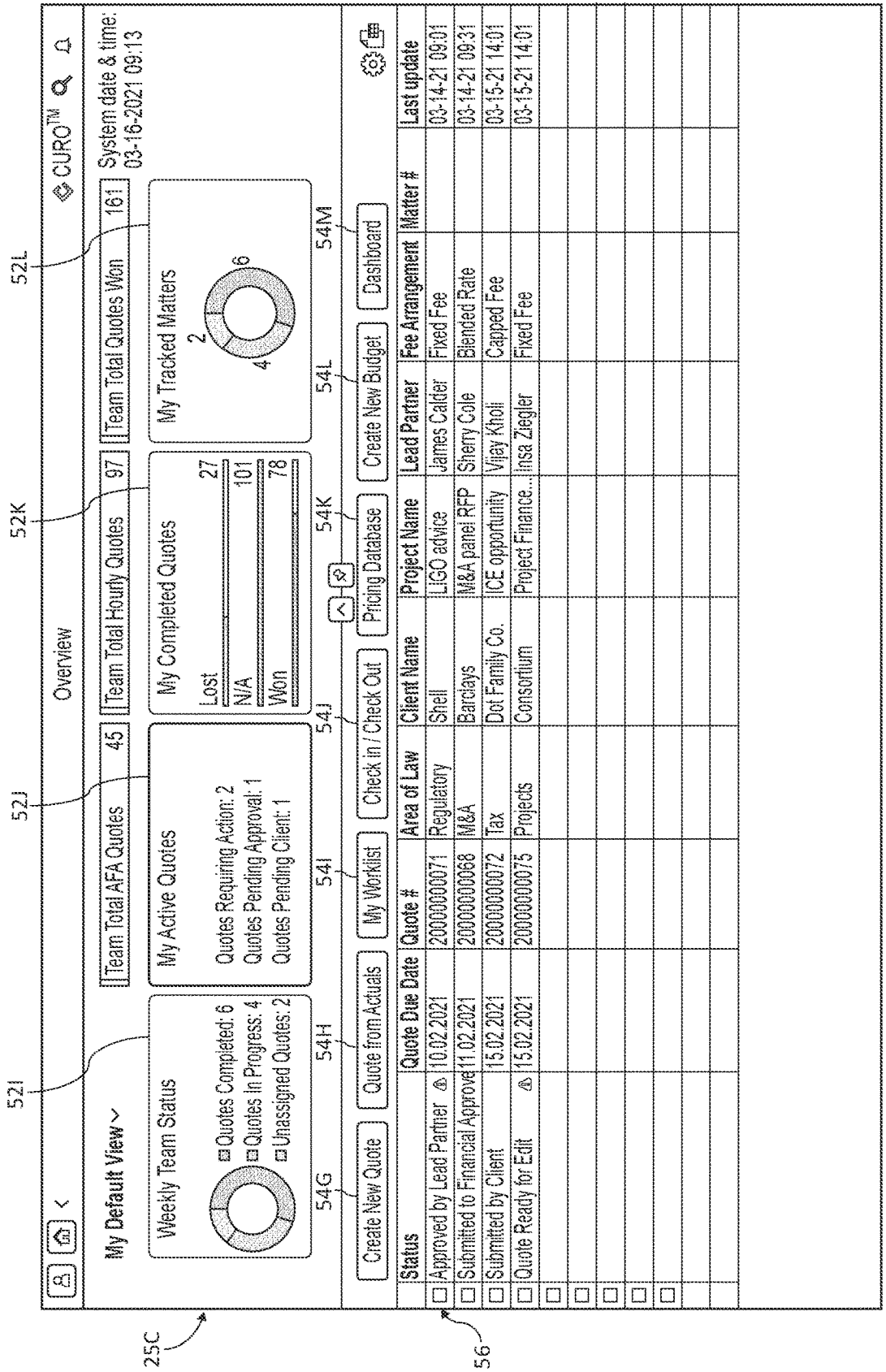

FIG. 7 illustrates the third GUI 25C after the user U has selected the active-quotes icon 52J. The user U has selected the active-quotes icon 52J, which has triggered the generation of a workflow table 56 including all active quotes using minimal processing and holding the workflow table 56 consistent positioning in comparison to FIG. 5. In this way the user U can quickly and easily view and access desired information without relocating his or her attention or generating a new GUI. In an embodiment, the new workflow table 56 is hot swapped into the third GUI 25C without affecting any of the other first icons 52 and/or second icons 54 and without causing regeneration of the third GUI 25C. In this way the system 10 conserves processing power that would otherwise be dedicated to regeneration of the third GUI 25C.

Figure 8:
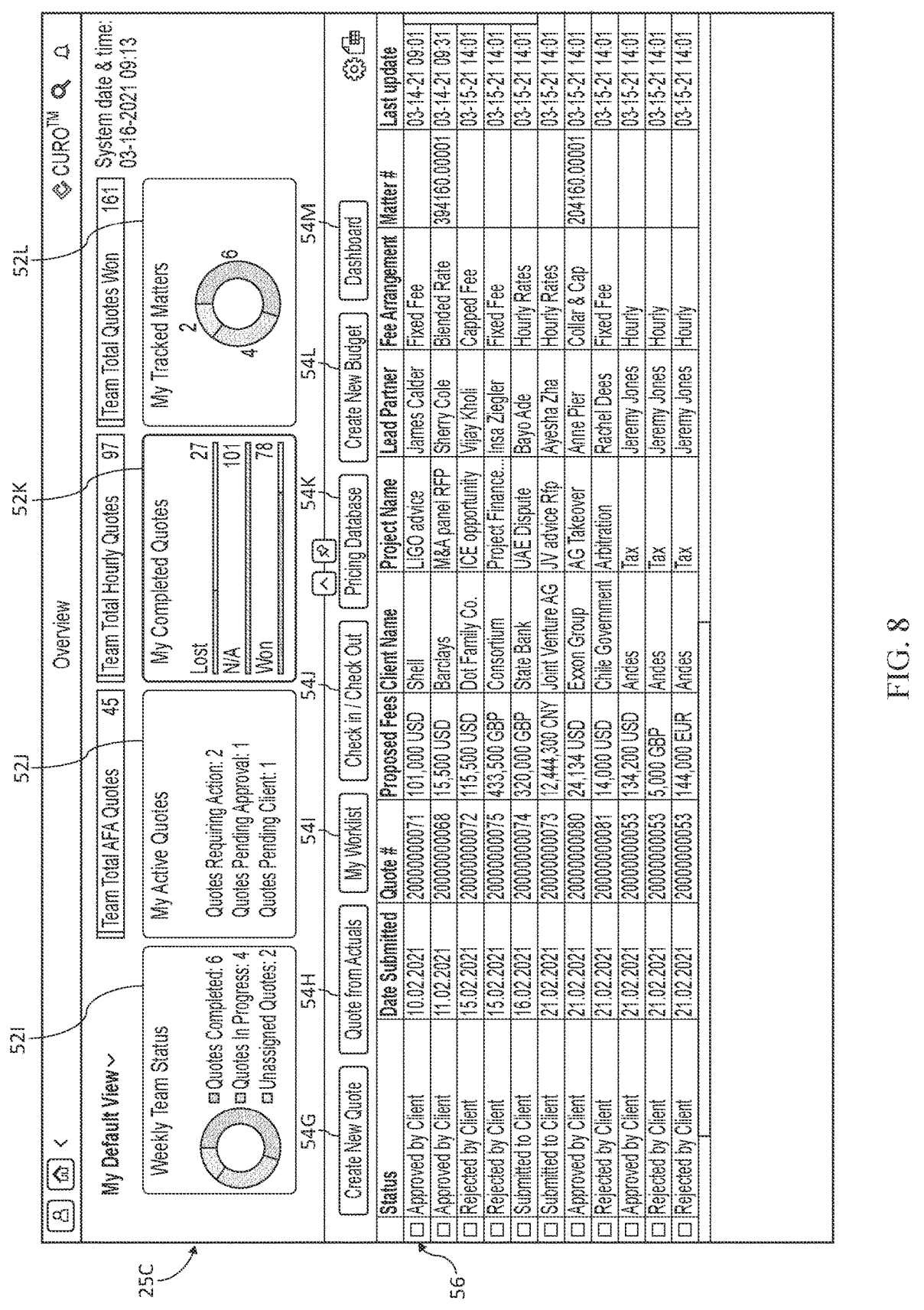

FIG. 8 illustrates the third GUI 25C after the user U has selected the completed-quotes icon 52K. The user U has selected the completed-quotes icon 52K, which has triggered the generation of a workflow table 56 including all completed quotes using minimal processing and holding the workflow table 56 positioning constant in comparison to FIGS. 5 and 6. In this way the user U can quickly and easily view and access desired information without relocating his or her attention or generating a new GUI. In an embodiment, the new workflow table 56 is hot swapped into the third GUI 25C without affecting any of the other first icons 52 and/or second icons 54 and without causing regeneration of the third GUI 25C. In this way the system 10 conserves processing power that would otherwise be dedicated to regeneration of the third GUI 25C.

Figure 9:
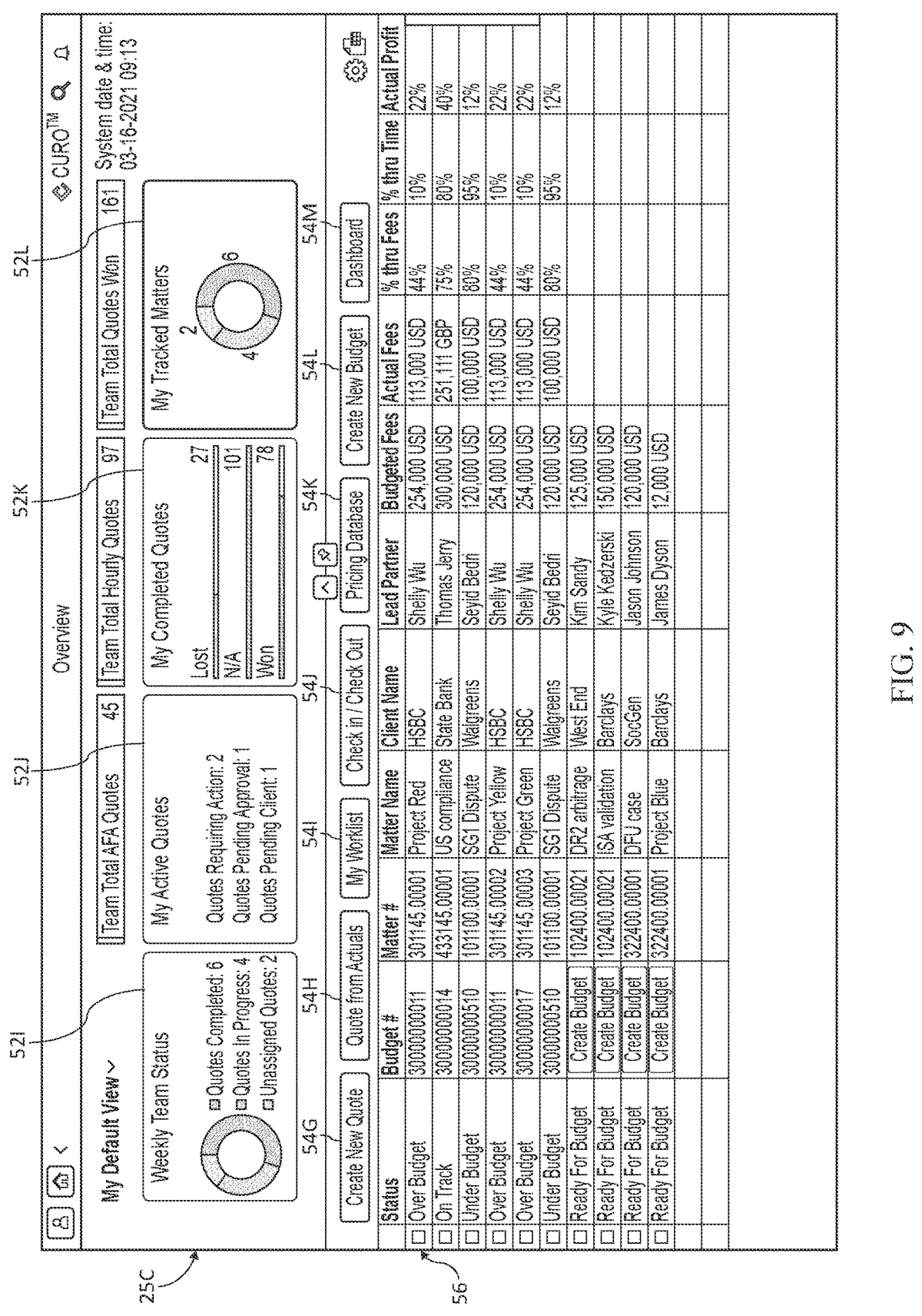

FIG. 9 illustrates the third GUI 25C after the user U has selected the tracked-matters icon 52L. The user U has selected the tracked-matters icon 52L, which has triggered the generation of a workflow table 56 including all tracked quotes using minimal processing and holding the workflow table 56 positioning constant in comparison to FIGS. 5 and 6. In this way the user U can quickly and easily view and access desired information without relocating his or her attention or generating a new GUI. In an embodiment, the new workflow table 56 is hot swapped into the third GUI 25C without affecting any of the other first icons 52 and/or second icons 54 and without causing regeneration of the third GUI 25C. In this way the system 10 conserves processing power that would otherwise be dedicated to regeneration of the third GUI 25C.

As illustrated by FIGS. 6 to 9, the system 10 enables alternative workflow tables 56 to be continuously hot swapped into the same position on the GUI 25 as the user selects different first icons. This happens without affecting any of the other first icons 52 and/or second icons 54, without causing regeneration of the third GUI 25C, and/or without stopping, shutting down or rebooting any of the background functions associated with the GUI 25C. In this way, the system 10 conserves processing power and memory space that would otherwise be dedicated to regeneration of the third GUI 25C and/or stopping, shutting down or rebooting background functions and/or storage of temporary data associated with such functions.

Figure 10:
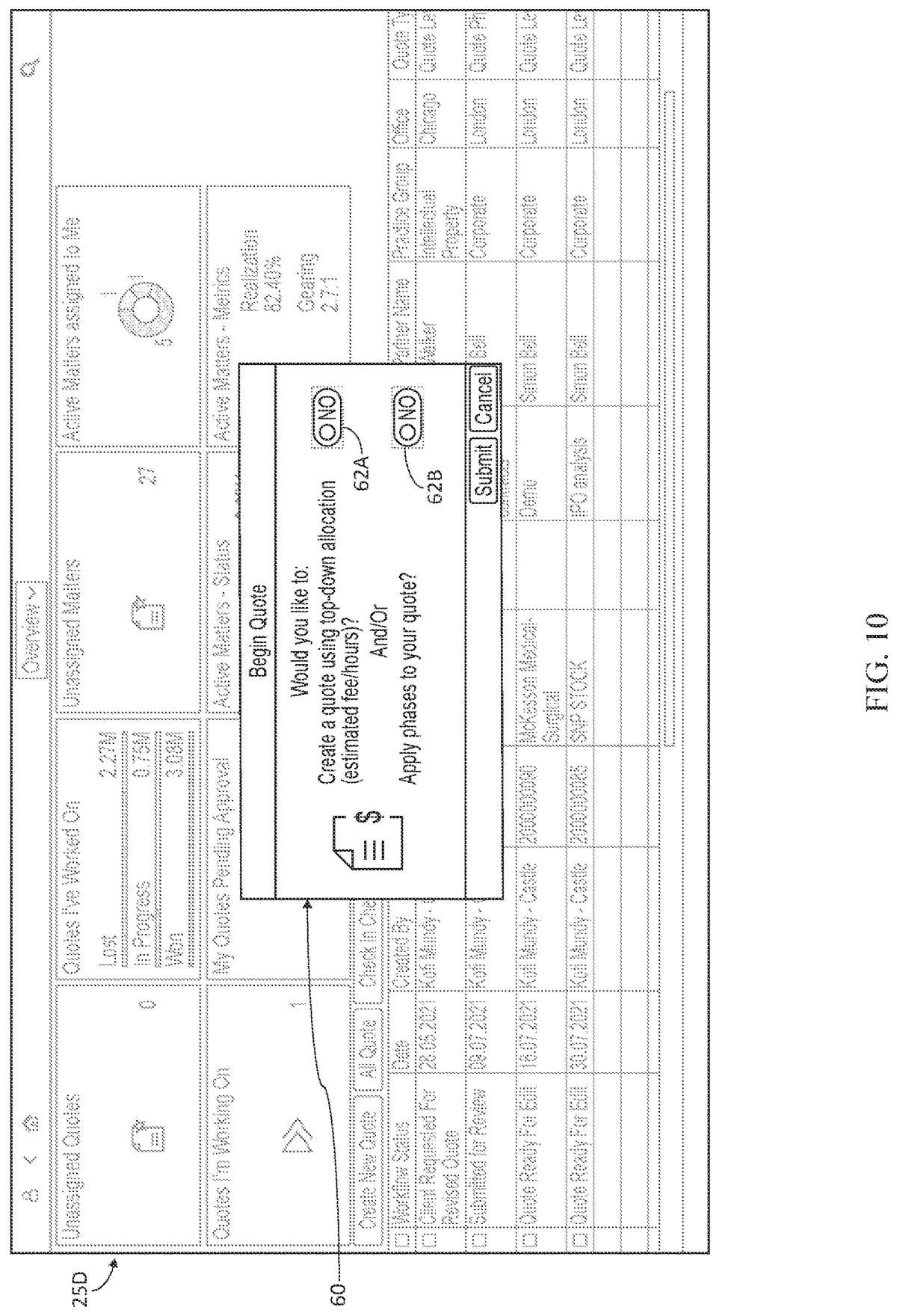

FIG. 10 illustrates an example embodiment of a fourth GUI 25D displayed on a user terminal 14 (e.g., a first user terminal 14a) for a user U (e.g., a first user $U_1$) in accordance with the present disclosure. In the illustrated embodiment, the system 10 is triggered to generate the fourth GUI 25D when the new-quote icon 54A is selected in the second GUI 25B and/or when the new-quote icon 54G is selected in the third GUI 25C. As illustrated, pressing the new quote icon 54A triggers a quote creation panel 60.

In the illustrated embodiment, the quote creation panel 60 provides the user U with at least two options 62A, 62B for creation of the new quote. The first option 62A is to create a new quote using top-down allocation. The second option 62B is to apply phases to the new quote. The system 10 enables the user U to select one or both of the two options 62A, 62B. Enabling these two options 62A, 62B for the user U creates flexibility to tailor a quote for the needs of a second party $P_2$, while also conserving processing power and memory space by avoiding the processing and storage of unnecessary data.

Figure 11:
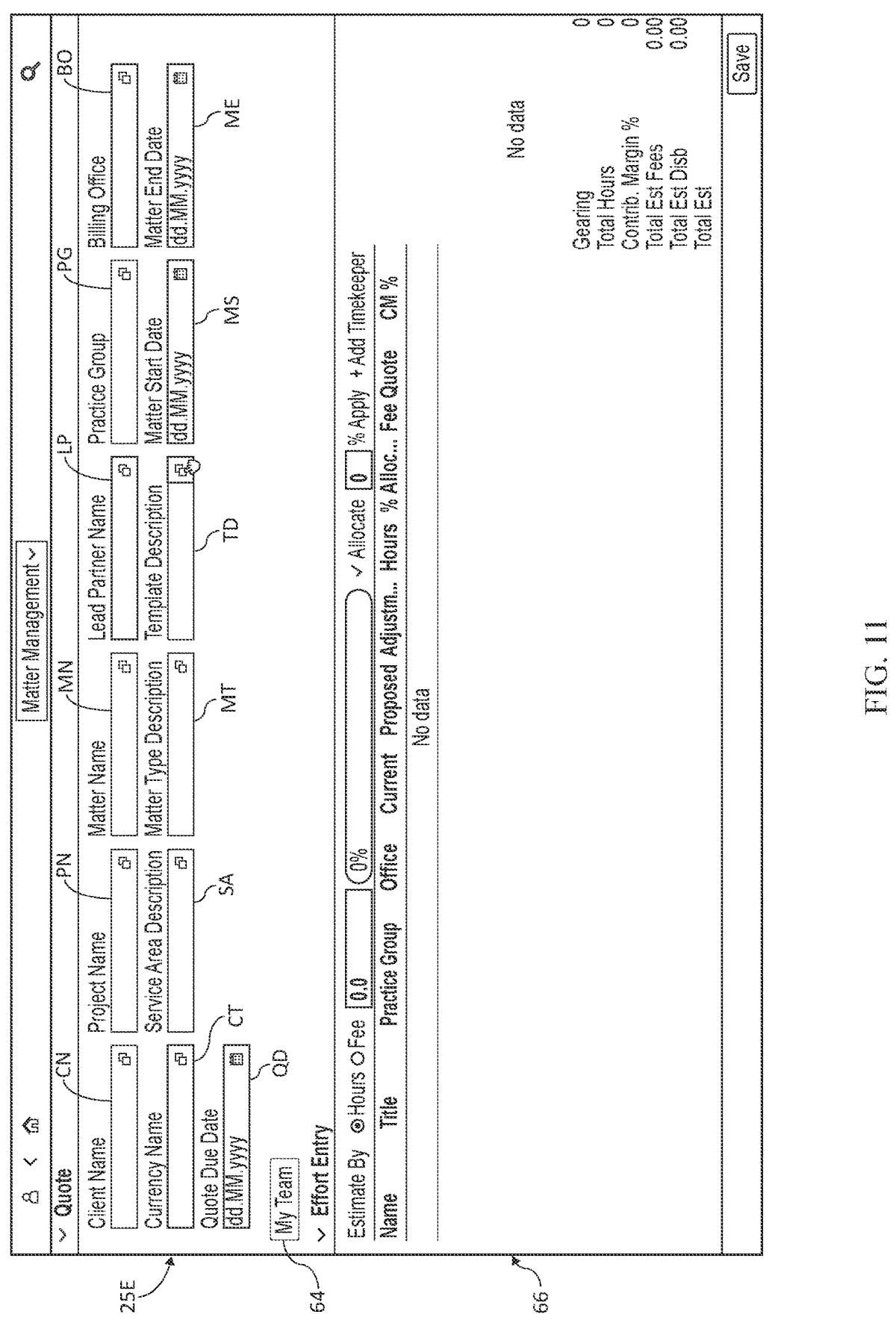

FIG. 11 illustrates an example embodiment of a fifth GUI 25E displayed on a user terminal 14 (e.g., a first user terminal 14a) for a user U (e.g., a first user $U_1$) in accordance with the present disclosure. In the illustrated embodiment, the system 10 triggers the fifth GUI 25E when the user U selects the submit icon on the quote creation panel 60 of the fourth GUI 25D. Here, the user U has selected to perform a top-down allocation using the first option 62A of the fourth GUI 25D, but has not selected to use phases using the second option 64B of the fourth GUI 25D. As illustrated, the fifth GUI 25E enables the user U to input a variety of input data regarding the new quote. In the illustrated embodiment, this input data includes the client name CN, project name PN, matter name MN, lead partner name LP, practice group PG, billing office BO, currency type CT, service area description SA, matter type description MT, template description TD, matter start date MS, matter end date ME, and quote due date QD. In the illustrated embodiment, the fifth GUI 25E also includes a team button 64 and a quote creation table 66, which are discussed in more detail below.

FIG. 12 illustrates an example embodiment of a sixth GUI 25F displayed on a user terminal 14 (e.g., a first user terminal 14a) for a user U (e.g., a first user $U_1$) in accordance with the present disclosure. The system 10 triggers generation of the sixth GUI 25F when a user U selects the team button 64 on the fifth GUI 25E. The sixth GUI 25F includes a team table 70 and a member table 72. The team table 70 includes a plurality of teams, with each team including a plurality of members shown in the member table 72. The members correspond to users U (e.g., a first user $U_1$ controlling a first user terminal 14a, a second user $U_2$ controlling a second user terminal 14b, and an nth user $U_n$ controlling an nth user terminal 14n). In the illustrated embodiment, the plurality of members for each team make up a team that has worked together in the past, such that the user U creating the quote can be confident that the team is able to work together efficiently and effectively and/or the database 26 already stores data regarding how work is typically divided amongst the team.

The teams shown in the sixth GUI 25F are saved on the central memory 22. In an embodiment, the system 10 is configured to generate a team based on data saved in the time entry system 18 for a previous or existing client or matter. For example, the system 10 can retrieve one or more of the billing timekeepers (e.g., workers) for a previous or existing client or matter, create a team including the timekeepers from the previous or existing client or matter, and generate the member table 72 with the members of that team. In this way the user U creating the quote can create a team that the user U knows has worked together for the same client and/or on the same matter in the past. The database 26 also stores data regarding how work is typically divided amongst the team, which improves the accuracy of the quote and prevents redundant data storage/generation. In an embodiment, the system 10 determines how work was divided for a previous or existing client, for example, by using the billing hours recorded by each timekeeper in the time entry system 18 to determine the percentage of total work performed by each timekeeper for the client or matter from which the team has been generated. In an embodiment, the system 10 sends a notification to the user terminal 14 of each user U who is being added as a member of the new team. In an embodiment, each user U can accept or reject being added as a member of a new team via his or her respective user terminal 14, thus ensuring that teams are created with members who are willing and able to handle an additional workload.

Figure 13:
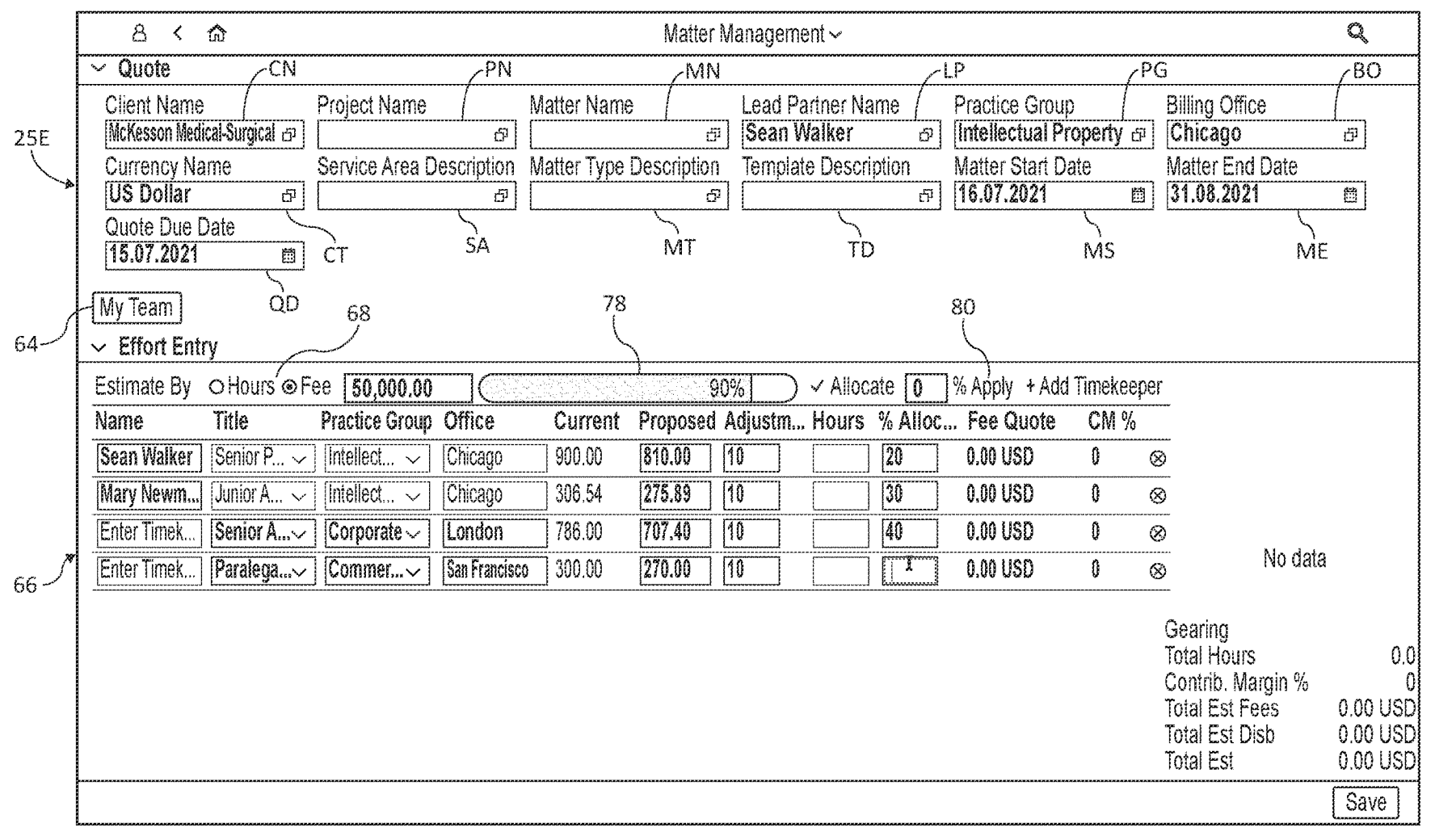

FIG. 13 illustrates the fifth GUI 25F after the system 10 has regenerated the quote creation table 66 with the members of a team that has been selected using the sixth GUI 25F. By automatically regenerating the quote creation table 66 with members of a preexisting team, the system 10 conserves processing power and memory space using pre-stored team data instead of generating and processing new team data. The system 10 further improves the user experience by reducing quote creation time, ensuring that team members who function well together continue to work together, and ensuring that the quote is not missing valuable members of a previous team which could affect the overall budget. In an embodiment, the system 10 also enables the user U to add additional members to and/or subtract existing members from the quote creation table 66.

In the illustrated embodiment, the fifth GUI 25F provides the user U with an input selection 68 which enables the user U to choose to create a quote based on hours worked or based on a fixed fee. The system 10 functions differently for each option and is particularly advantageous in ensuring that each member is able to budget the time needed to perform the work in the quote. In FIG. 13, the user U has chosen to create a quote based on a fixed fee. Here, the fixed fee is set at $50,000. For each member (e.g., another user U operating with another user terminal 14), the quote creation table 66 displays basic information, for example, the worker's name, title, practice group, office, and billing rate. The system 10 also enables an adjustment to be applied to each worker's billing rate. Here, the user U has applied a 10% adjustment to each worker's billing rate, such that the system 10 has automatically reduced each current billing rate by 10% to the proposed billing rate. Here, the hours, fee quote and contribution margin percentage (CM %) are still empty because the user U has not yet finished entering input data and applying the percentage allocation. In the illustrated embodiment, the fifth GUI 25E also includes an allocation bar 78, which indicates how much of the project is currently allocated (90% in FIG. 9). In an embodiment, the system 10 prevents the new quote from being completed until the percentage allocation reaches 100%. In an embodiment, the system 10 automatically adjusts the percentage allocation for one or more members to cause the total percentage allocation to be 100% (e.g., increases each member's percentage allocation by 10% in the illustrated embodiment to adjust from 90% to 100%). In this way, the system 10 improves the quotes accuracy by generating the maximum number of allowable hours for each member to ensure 100% allocation.

In the illustrated embodiment, the system 10 automatically enables or disables entry of certain information based on the input selection 68 chosen by the user. For example, in an embodiment, when the user selects to create a quote based on hours worked, the system 10 enables the fifth GUI 25F to allow the user to enter desired hours for each member in the hours column of the quote creation table 66; however, when the user selects to create a quote based on fixed fee, the system 10 disables entry of the hours worked and instead automatically generates the hours worked based on the percentage allocation. In another embodiment, the system 10 allows the user U to enter either the hours and/or the percentage allocation for one or more of the members, and the automatically generates the remaining hours and/or percentage allocation for one or more of the other members in view of the remaining fees available. In these ways, the system 10 improves processing efficiency and data storage by enhancing minimal information to create a full quote and by preventing the storage of unnecessary data.

In an embodiment, the system 10 automatically populates the percentage allocations based on previous projects that the team has worked together. That is, the system 10 processes historical data and determines what percentage of the work each member is likely to perform. In this way, the system 10 creates an accurate quote based on historical worked amounts. In an embodiment, the system 10 retrieves the historical data from the time entry system 18. In an embodiment, the time entry system 18 includes time entries for a plurality of matters. The system 10 can be configured to retrieve time entry data for a matter including multiple members and determine the percentage of work that each of the members performed for that matter. The system 10 is then configured to use this data to populate the percentage allocations based on previous projects, for example, assuming that the members will work the same percentage amounts for the quote that have been worked for previous matters. Thus, in an embodiment, the user U is simply required to enter a total fee amount and select a team, and the system 10 enhances the data stored from previous time entries and/or quotes to generate the new quote. In this way, the system 10 improves processing efficiency and reduces data storage redundancy by enhancing and reusing previously available data, while also improving the accuracy of the new quote based on historical trends. In an embodiment, the user U creating the quote can then accept or adjust the percentage allocations determined by the system 10.

As illustrated, in an embodiment, the system 10 enables the user U to adjust the allocation percentage. In an embodiment, the system 10 is also configured to automatically adjust the allocation percentage based on work in progress or other quotes for one or more member. For example, the system 10 can use input data including at least one of the matter start date MS, matter end date ME and/or estimated duration ED to determine the expected commitment for each member during a particular time period. The system 10 is configured to determine whether each member is also committed to other work during this time period based on previous quotes, for example, by determining whether the new time period indicated by the input data overlaps with other time periods for which one or more team member has already been committed based on other quotes. The system 10 can therefore determine whether the percentage allocation and/or total hours for the current quote would push the member over a threshold for a particular time period. In an embodiment, the system 10 automatically adjusts the allocation percentage to the maximum allowable allocation percentage for that member based on the threshold. In this way, the system 10 improves processing efficiency and reduces data storage redundancy by enhancing and reusing previously available data, while also improving the accuracy of the new quote using information regarding how much time one or more member can realistically perform over a given time period.

In an embodiment, the system 10 sends a notification to the user terminal 14 of each user U who is being added to a new quote after determining that the percentage allocation and/or total hours for the new quote would push the user U over the threshold for a particular time period. In an embodiment, each user U can use his or her user terminal 14 to accept or reject the new quote via his or her respective user terminal 14, thus ensuring that teams are created with members who are willing and able to handle an additional workload. In an embodiment, the system 10 removes the user U as a member of the new team upon rejection of the addition by the user U. In an embodiment, the system 10 automatically creates a placeholder or adds another member with similar credentials in place of the user U who has rejected the membership.

In an embodiment, the system 10 stores rules which are implemented to automatically adjust the percentage allocations. For example, the system 10 can store rules about the minimum or maximum percentage of time that should be spent by certain levels of seniority (e.g., partner must perform at least 10%, junior associate must perform at least 50%, etc.). The system is therefore configured to ensure that particular thresholds are met and/or automatically adjust values when the thresholds have not been met.

In an embodiment, the system 10 retrieves utilization data for various users U to build a team for a new quote. The system 10 can retrieve the utilization data. from the time entry system 18. In an embodiment, the system 10 generates a team based on users U with the lowest overall utilization. This way, the system 10 ensures that each team member is not being overworked and can effectively perform the work in the quote during the requested time period, and also that the first party P1 is efficiently and effectively using all employees.

FIG. 14 illustrates the fifth GUI 25E after the total percentage allocation has reached 100% (e.g., as shown by the allocation bar 78). Here, the system 10 has regenerated the hours, fee quote and contribution margin percentage (CM %) for each worker. In the illustrated embodiment based on the flat fee (e.g., here, $50,000), the system 10 generates the hours for each member based on the member's corresponding percentage allocation while also ensuring that the sum of the fee quotes for each member does not exceed the entered flat fee. The system 10 further determines the fee quote for each member based on the generated hours and proposed billing rate. The system determines the contribution margin percentage, for example, based by calculating CM as (Fee Quote-Cost)/(Fee Quote). In an embodiment, the system 10 flags the quote if a particular threshold is not met by the contribution margin percentage.

FIG. 15 illustrates the fifth GUI 25E after the user U has pressed the percentage apply button 80. The percentage apply button has triggered the system 10 to generate a plurality of additional buttons 84. The plurality of additional buttons 84 includes an assumptions button 84A, a disbursement button 84B, a quote-summary button 84C, and a fee-arrangements button 84D. The assumptions button generates the fifteenth GUI 25O of FIG. 26, which enables the user U to add text tags regarding assumptions to one or more quotes generated as discussed herein. The disbursement button 84B generates the sixteenth GUI 25P of FIG. 27, which enables the user U to add additional disbursements to one or more quotes generated as discussed herein. The quote-summary button 84C generates the twenty-second GUI 25V of FIG. 33. The fee-arrangements button 84D generates the ninth GUI 25I of FIG. 20.

In an embodiment, the system 10 at this point is configured to determine whether each member can handle the workload being quoted. For example, the system 10 is configured to determine whether the total hours for the new quote would push any member over a predetermined threshold for a particular time period when combined with that member's existing hours that have been committed to an overlapping time period in other quotes. In an embodiment, the system 10 flags the member (another user U) and sends a notification to user terminal 14 of each user U who has surpassed the threshold. In an embodiment, each user U can use his or her user terminal 14 to accept or reject the new quote via his or her respective user terminal 14. In an embodiment, the system 10 automatically removes the user U as a member of the new team upon rejection by the user U. In an embodiment, the system 10 automatically creates a placeholder or adds another member with similar credentials in place of the user U who has rejected the team membership.

In an embodiment, upon determining that a workload threshold has been surpassed, the system 10 informs the user U creating the new quote of the workload conflict. In an embodiment, the system 10 further informs the user U how adjustments can be made so that there is no workload conflict. In an embodiment, the system 10 proposes a new member to replace a conflicted member, with the new member having for example the same title and/or practice group as the conflicted member. In an embodiment, the system 10 proposes a new matter start date MS, matter end date ME and/or estimated duration ED which would allow the conflicted member to complete the desired workload without surpassing the threshold. For example, the conflicted member may already be committed to a previous workload for the initial dates entered by the user U, but may be available if the dates are shifted and/or the duration is extended. In this way, the system 10 ensures that all quotes can be effectively completed by the team members within the particular time period being promised by the quote.

Figure 16:
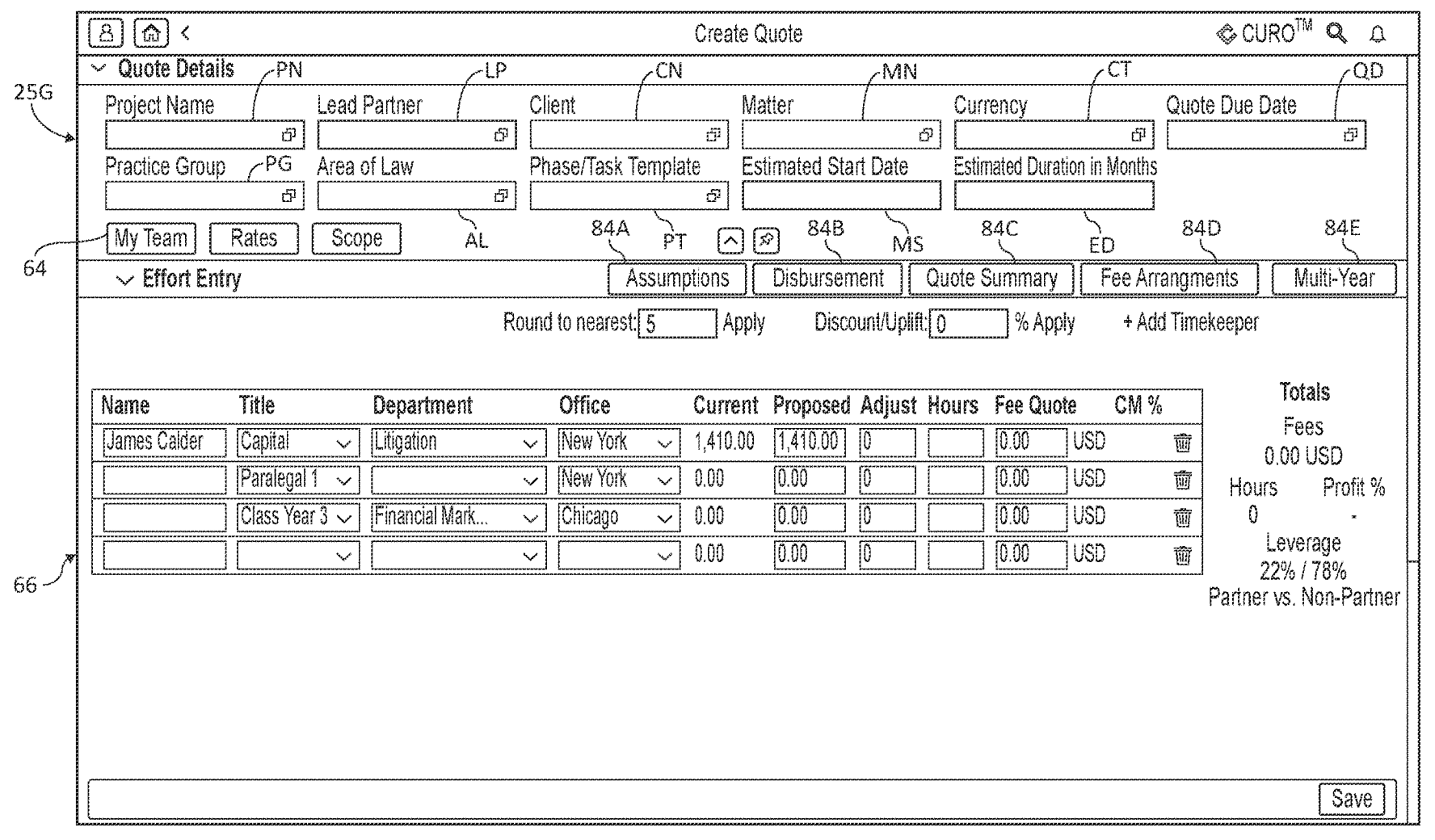

FIG. 16 illustrates an example embodiment of a seventh GUI 25G displayed on a user terminal 14 (e.g., a first user terminal 14a) for a user U (e.g., a first user $U_1$) in accordance with the present disclosure. Here, the seventh GUI 25G is an alternative embodiment of the fifth GUI 25E and contains many of the same elements. FIG. 16 does not use the top-down allocation used in FIGS. 11 to 15. In the illustrated embodiment, the system 10 triggers the seventh GUI 25G when the user U selects the submit button on the quote creation panel 60 of the fourth GUI 25D while choosing not to use top-down allocation. The system 10 enables the user U to input a variety of data regarding the new quote. In the illustrated embodiment, this information includes the project name PN, lead partner name LP, client name CN, matter name MN, currency type CT, quote due date QD, practice group PG, area of law AL, phase/task template PT, matter start date MS, and estimated duration ED. In the illustrated embodiment, the seventh GUI 25G also includes a team button 64 and a quote creation table 66. The quote creation table can be generated using the team button 64, as discussed above with respect to the fifth GUI 25E and/or sixth GUI 25F. Similar to FIG. 14, the seventh GUI 25G also includes a plurality of buttons 84. Here, the plurality of buttons 84 include an assumptions button 84A, a disbursement button 84B, a quote-summary button 84C, and a fee-arrangements button 84D, and a multi-year button 84E. The seventh GUI 25G can include any of the features discussed herein with respect to the fifth GUI 25E, and vice versa.

Figure 17:
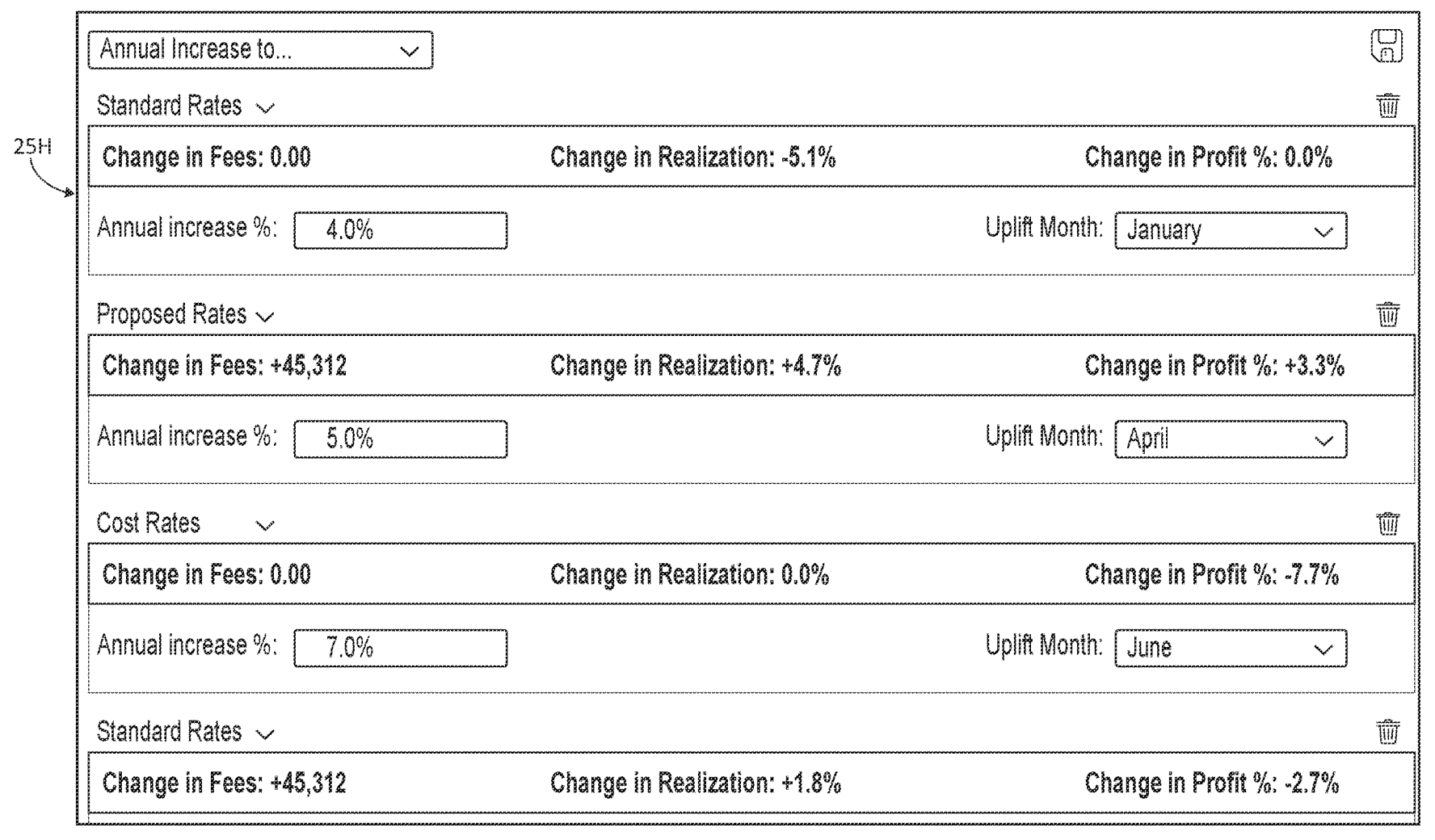

FIG. 17 illustrates an example embodiment of an eighth GUI 25H displayed on a user terminal 14 (e.g., a first user terminal 14a) for a user U (e.g., a first user $U_1$) in accordance with the present disclosure. The system 10 triggers the eighth GUI 25H when a user U selects the multi-year button 84E on the seventh GUI 25G. In an embodiment, the system 10 also generates the GUI 25 of FIG. 19 when a user U chooses to implement the second option 52B of the fourth GUI 25D of FIG. 10. The eighth GUI 25H enables the user U to set increases for team members' billing rates at various intervals, for example, to account for a lengthy project which will span several months/years. This way, the total quoted amount for a lengthy project is not underestimated. As illustrated, the eighth GUI 25H enables the user U to adjust the amount of rate increase and the estimated date at which the rate increase will be implemented. In an embodiment, this information is already predetermined by the system 10 and automatically implemented for projects that surpass a predetermined amount of time.

Figure 18:
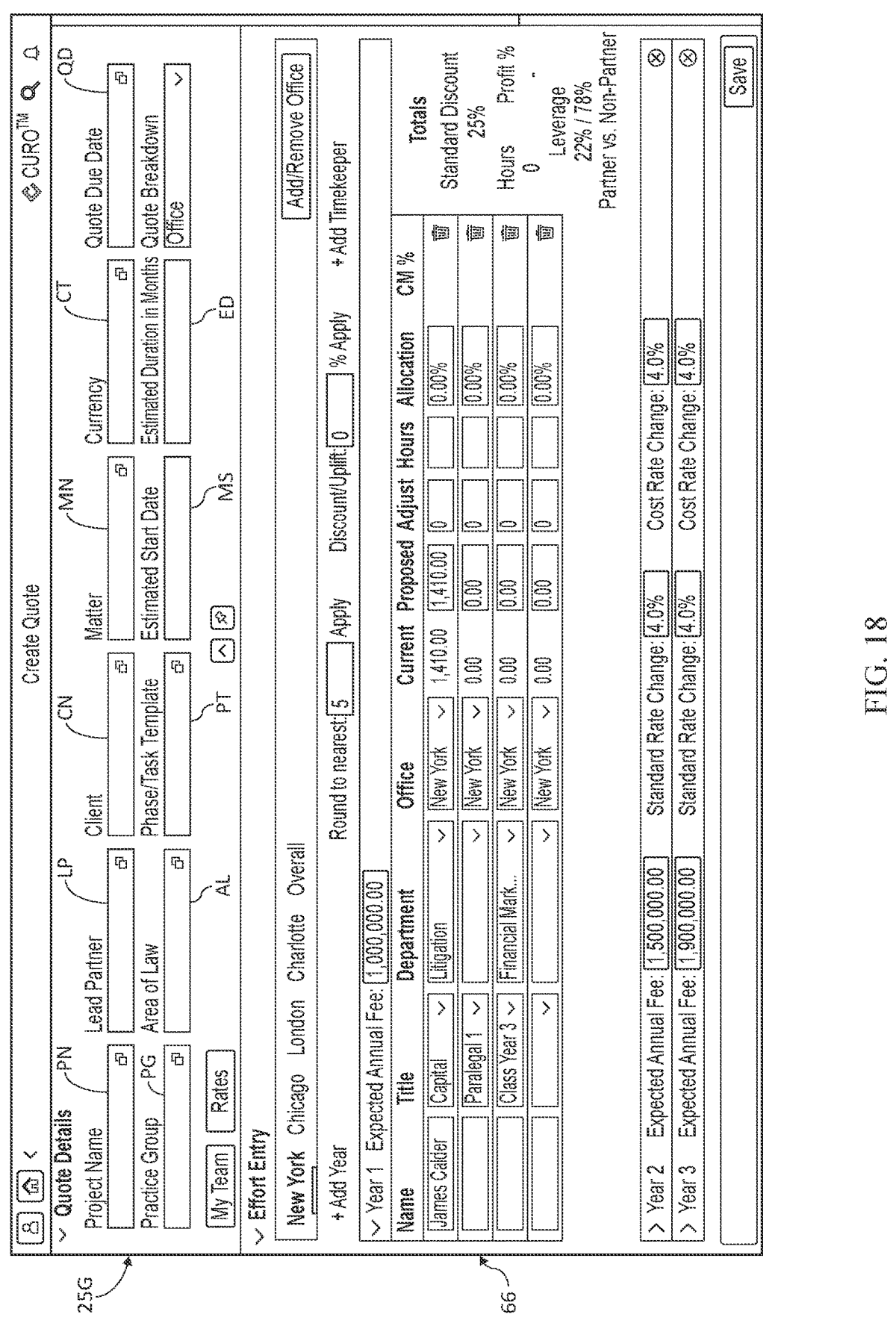

FIG. 18 illustrates the seventh GUI 25G after the system 10 has regenerated the quote creation table 66 for multiple phases using the eighth GUI 25H. As illustrated, the seventh GUI has added multiple years (here, Year 1, Year 2 and Year 3). In an embodiment, the system generates a quote creation table 66 for each year. In an embodiment, the system 10 can automatically generate the same quote creation table 66 for each year, which the user U can adjust as desired to account for changes which the user U expects to occur over the course of multiple years. The seventh GUI 25G in FIG. 18 further allows for multiple quote creation tables 66 to be generated for each of multiple offices, allowing global work to be included in the quote.

Figure 19:
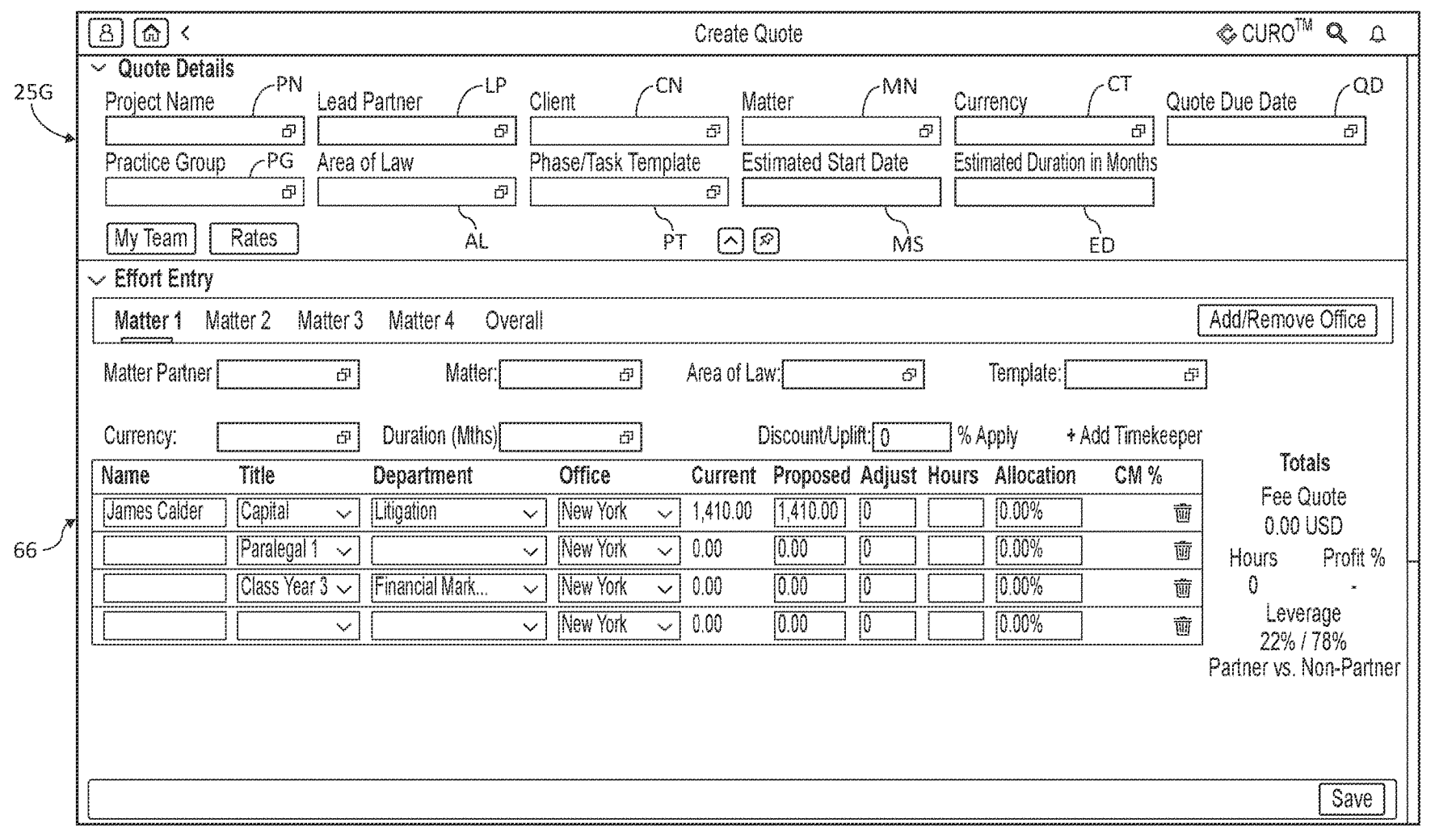

FIG. 19 illustrates an alternative embodiment of the seventh GUI 25G in which the user U has chosen to generate a quote that includes multiple matters. As illustrated, individual quotes can be generated for each of the multiple matters can be generated as discussed herein for a single matter. In an embodiment, the system 10 can automatically generate the same quote creation table 66 for each matter, which the user U can adjust as desired to account for differences between matters.

Figure 20:
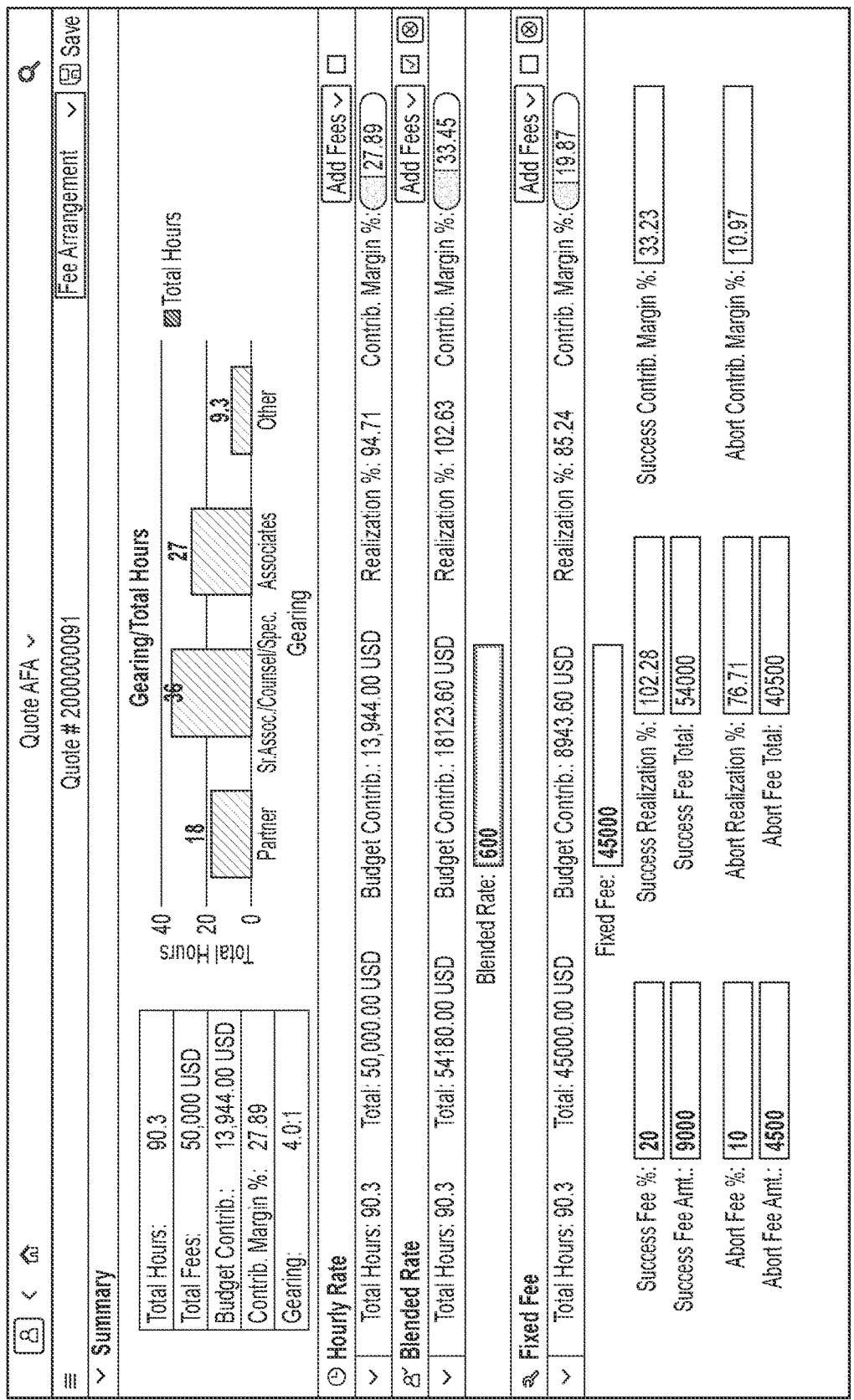

FIG. 20 illustrates an example embodiment of a ninth GUI 25I displayed on a user terminal 14 (e.g., a first user terminal 14a) for a user U (e.g., a first user $U_1$) in accordance with the present disclosure. The ninth GUI 25I illustrates a summary of the fee arrangement for the quote. In the illustrated embodiment, the system 10 automatically generates the ninth GUI 25I when the user U selects the fee-arrangements button 84D on the fifth GUI 25E or the seventh GUI 25G. In an embodiment, the system uses various data shown in the ninth GUI 25I to determine whether particular thresholds are met or exceeded and to prioritize quotes which are more favorable (e.g., based on budget contribution, contribution margin percentage, gearing, realization percentage, contribution margin percentage, etc.). In an embodiment, the system 10 further creates an addition screen which arranges icons for the quotes based on the priory determined from this data.

Figure 21:

FIG. 21 illustrates an example embodiment of a tenth GUI 25J displayed on a user terminal 14 (e.g., a first user terminal 14a) for a user U (e.g., a first user $U_1$) in accordance with the present disclosure. The tenth. GUI 25J enables the user U to filter and/or search through existing quotes. In an embodiment, the system 10 arranges the quotes on the tenth GUI 25J based on priority data as discussed above. In the illustrated embodiment, the tenth GUI 25J enables the user U to select multiple quotes and compare data. In an embodiment, a user U can also select one of the quotes shown in the tenth GUI 25J and use the parameters to generate a new quote for the same or a different second party $P_2$; the system 10 then automatically generates a new quote creation screen, for example, the fifth GUI 25E or the seventh GUI 25G. With this feature, the system 10 creates processing efficiency, improves the user experience and eliminates errors by allowing the user U to generate new quotes based on existing quotes without having to reenter various data.

Figure 22:
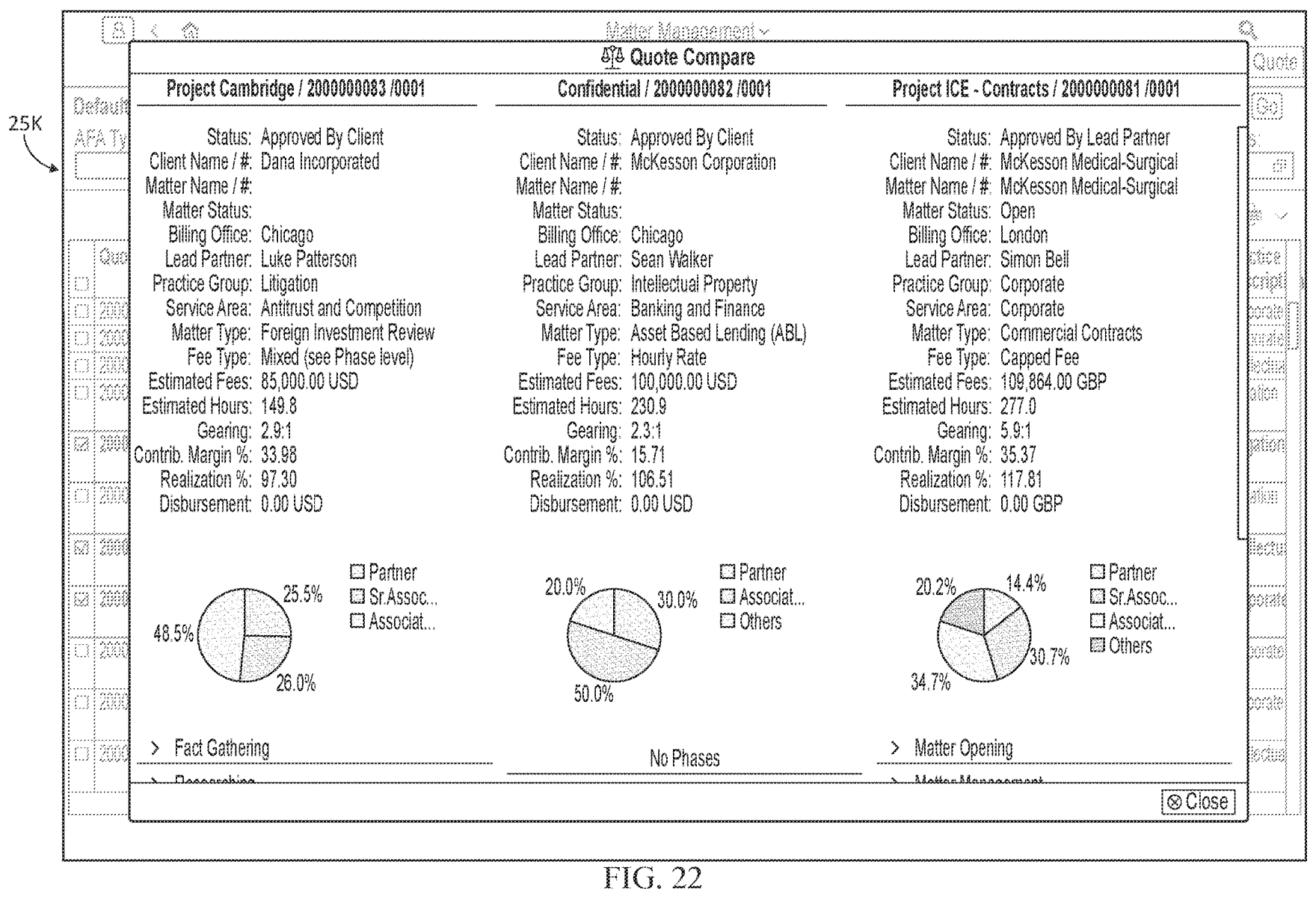

FIG. 22 illustrates an example embodiment of an eleventh GUI 25K displayed on a user terminal 14 (e.g., a first user terminal 14a) for a user U (e.g., a first user $U_1$) in accordance with the present disclosure. The system 10 generates the eleventh GUI 25K, for example, when a user U selects multiple quotes to compare using the tenth GUI 25J. The eleventh GUI 25K is advantageous, for example, for providing a side-by-side comparison of multiple quotes and their particular statistics which have been generated by the system 10.

Figure 23:
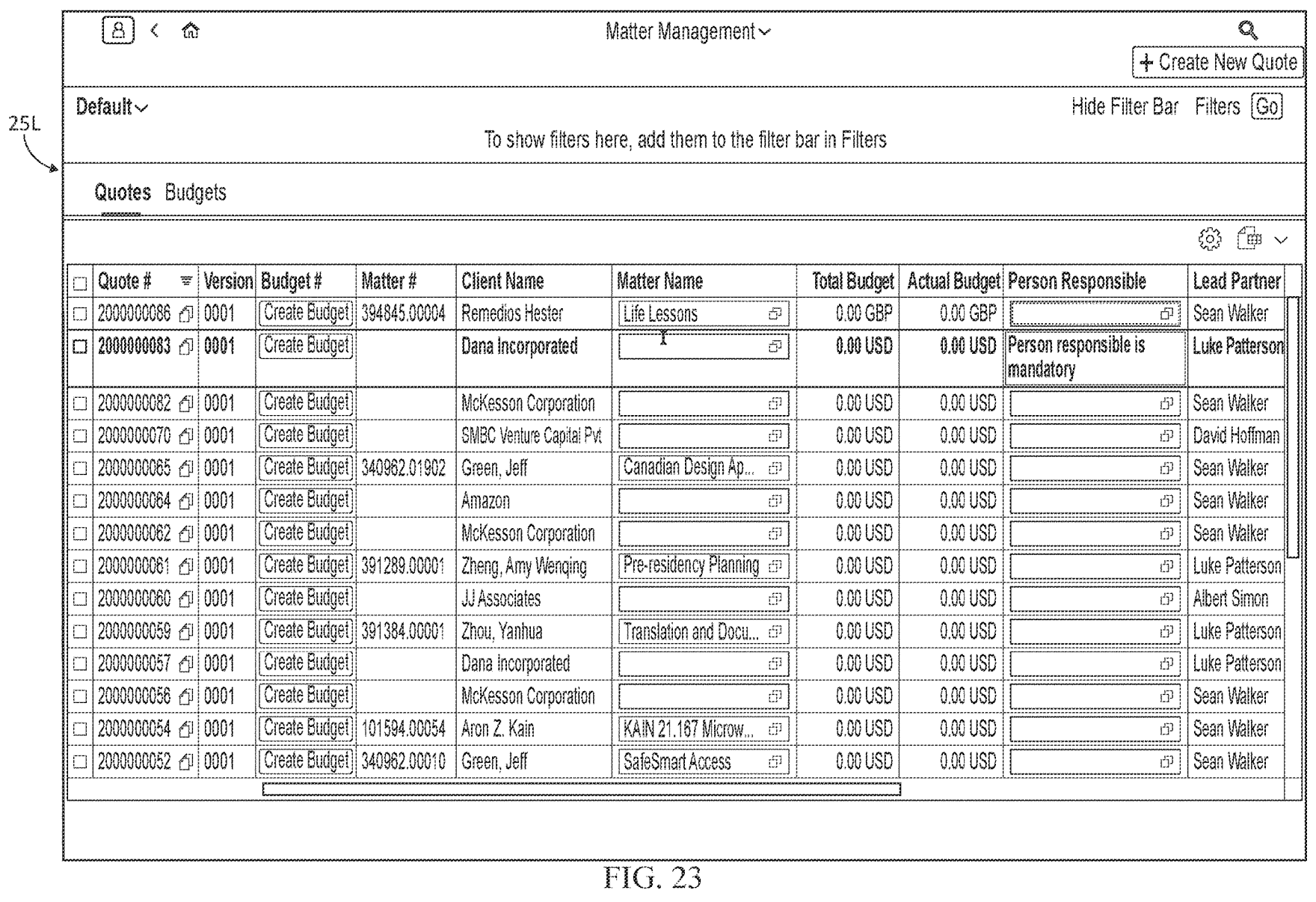

FIG. 23 illustrates an example embodiment of a twelfth GUI 25L displayed on a user terminal 14 (e.g., a first user terminal 14a) for a user U (e.g., a first user $U_1$) in accordance with the present disclosure. The twelfth GUI 25L enables the user U to filter and/or search through existing quotes and/or budgets. In an embodiment, the system 10 arranges the quotes in on the twelfth GUI 25L based on priority data as discussed above. In the illustrated embodiment, the twelfth GUI 25L enables the user U to select multiple quotes and compare data. In an embodiment, a user U can also select one of the quotes shown in the twelfth GUI 25L and use the parameters to generate a new quote for the same or a different second party $P_2$; the system 10 then automatically generates a new quote creation screen, for example, the fifth GUI 25E or the seventh GUI 25G. With this feature, the system 10 creates processing efficiency, improves the user experience and eliminates errors by allowing the user U to generate new quotes based on existing quotes without having to reenter various data. In an embodiment, the twelfth GUI 25L enables the user U to create a budget for one or more quotes. The budget can be created based on the total amount of the quote once the quote has been approved, or can be adjusted for example based on changes to the quote and/or additional work requested by the second party $P_2$. In an embodiment, the budget is automatically created once the quote is approved and/or assigned to a lead partner. In an embodiment, the system 10 then links the budget to the time entry system 18 so that the budget is used to control time entries entered by individual timekeepers for that project. Thus, in an embodiment, the system 10 generates a budget threshold for the time entry system 18 once the quote is approved and/or assigned to a lead partner.

Figure 24:
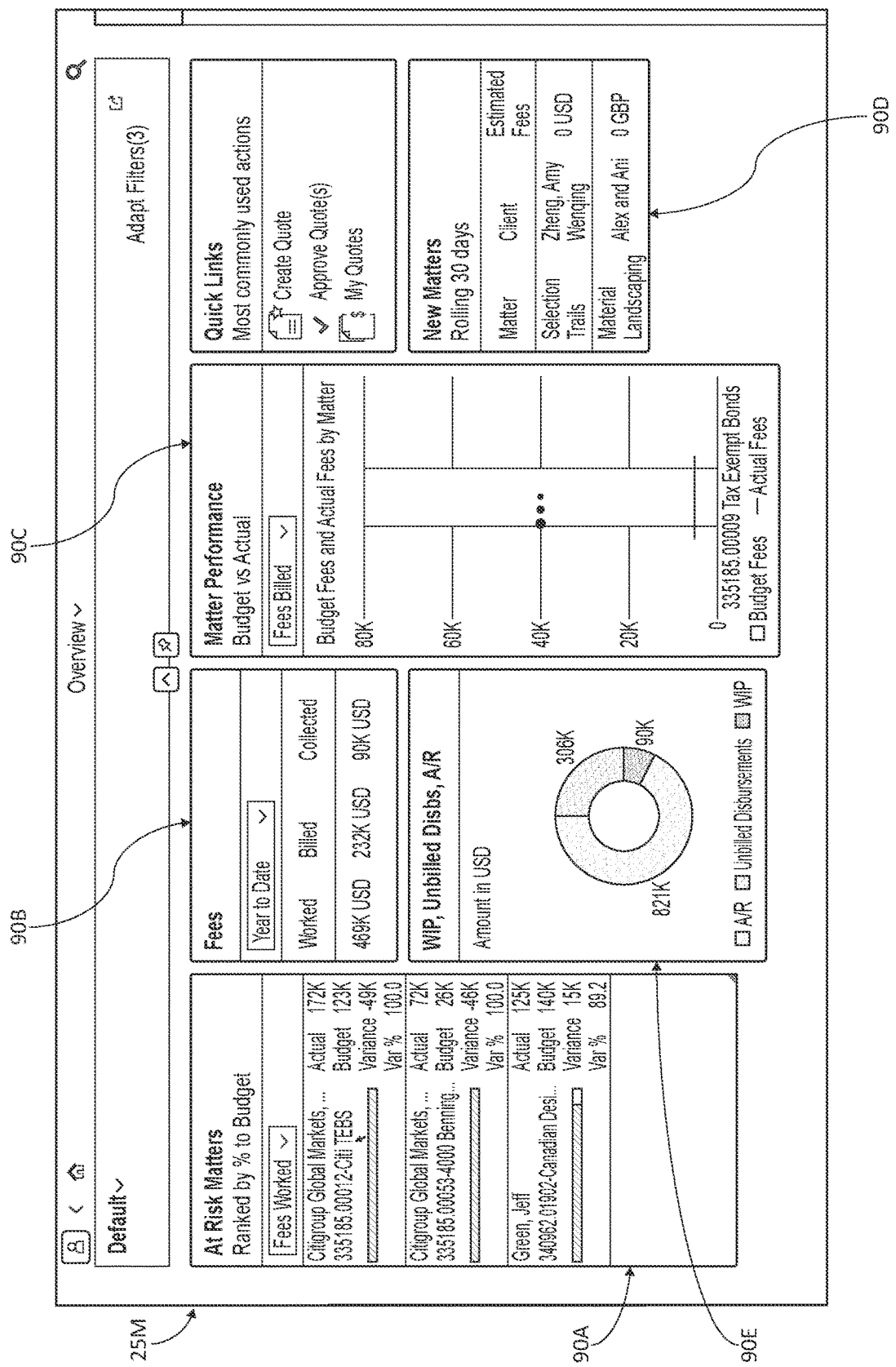

FIG. 24 illustrates an example embodiment of a thirteenth GUI 25M displayed on a user terminal 14 (e.g., a first user terminal 14a) for a user U (e.g., a first user $U_1$) in accordance with the present disclosure. The thirteenth GUI 25M enables the user U to view actual performance of previous quotes, for example, to determine whether previous quotes overestimated or underestimated the amount of work that needed to be performed for a matter. In an embodiment, the system 10 automatically adjusts parameters for new quotes based upon whether previous similar quotes were overestimated or underestimated. For example, if a previous quote exceeded the expected time by 10%, the system 10 automatically adjusts the time for each member in the quote creation table 66 by 10% to account for this discrepancy. Specifically, for example, when the user U chooses to create a new quote based on a previous quote that exceeded the expected time by 10%, the system 10 automatically adjusts the time for each member in the quote creation table 66 for the new quote by 10% to account for this discrepancy. In another example, if a team member of a previous quote performed more or less of the total work than expected, the system 10 automatically adjusts the percentage allocation for that team member in the quote creation table 66 for a new quote when that same team is used. Specifically, for example, when the user U chooses to create a new quote based on a previous quote in which a team member of a previous quote performed more or less of the total work than expected, the system 10 automatically adjusts the percentage allocation for that team member in the quote creation table 66 for a new quote when that same team is used.

In an embodiment, the system 10 is constantly updating the team data associated with each team (e.g., historical percentage allocation) so that the accuracy of new quotes is improved when the teams are used in new quotes. In this way, the accuracy of the quotes generated by the system 10 improves as the total number of quotes increases and the accuracy of those quotes is evaluated (e.g., using the data shown in the thirteenth GUI 25M).

In the illustrated embodiment, the thirteenth GUI 25M includes an at risk matter panel 90A, a fees panel 90B, a matter performance panel 90C, a new matters panel 90D, and a WIP panel 90E. In an embodiment, the at risk matter panel 90A triggers generation of the seventeenth GUI 25Q in FIG. 28. In an embodiment, the fees panel 90B triggers generation of the eighteenth GUI 25R in FIG. 29. In an embodiment, the matter performance panel 90C triggers generation of the nineteenth GUI 25S in FIG. 30. In an embodiment, the new matters panel 90D triggers generation of the twentieth GUI 25T in FIG. 31, In an embodiment, the WIP panel 90E triggers generation of the twenty-first GUI 25U in FIG. 32.

FIG. 25 illustrates an example embodiment of a fourteenth GUI 25N displayed on a user terminal 14 (e.g., a first user terminal 14a) for a user U (e.g., a first user $U_1$) in accordance with the present disclosure. The fourteenth GUI 25N is an alternative embodiment of the twelfth GUI 25L and enables the user U to filter and/or search through existing quotes and/or budgets. Any of the features of the twelfth GUI 25L can be included in the fourteenth GUI 25N, and vice versa.

Figure 26:
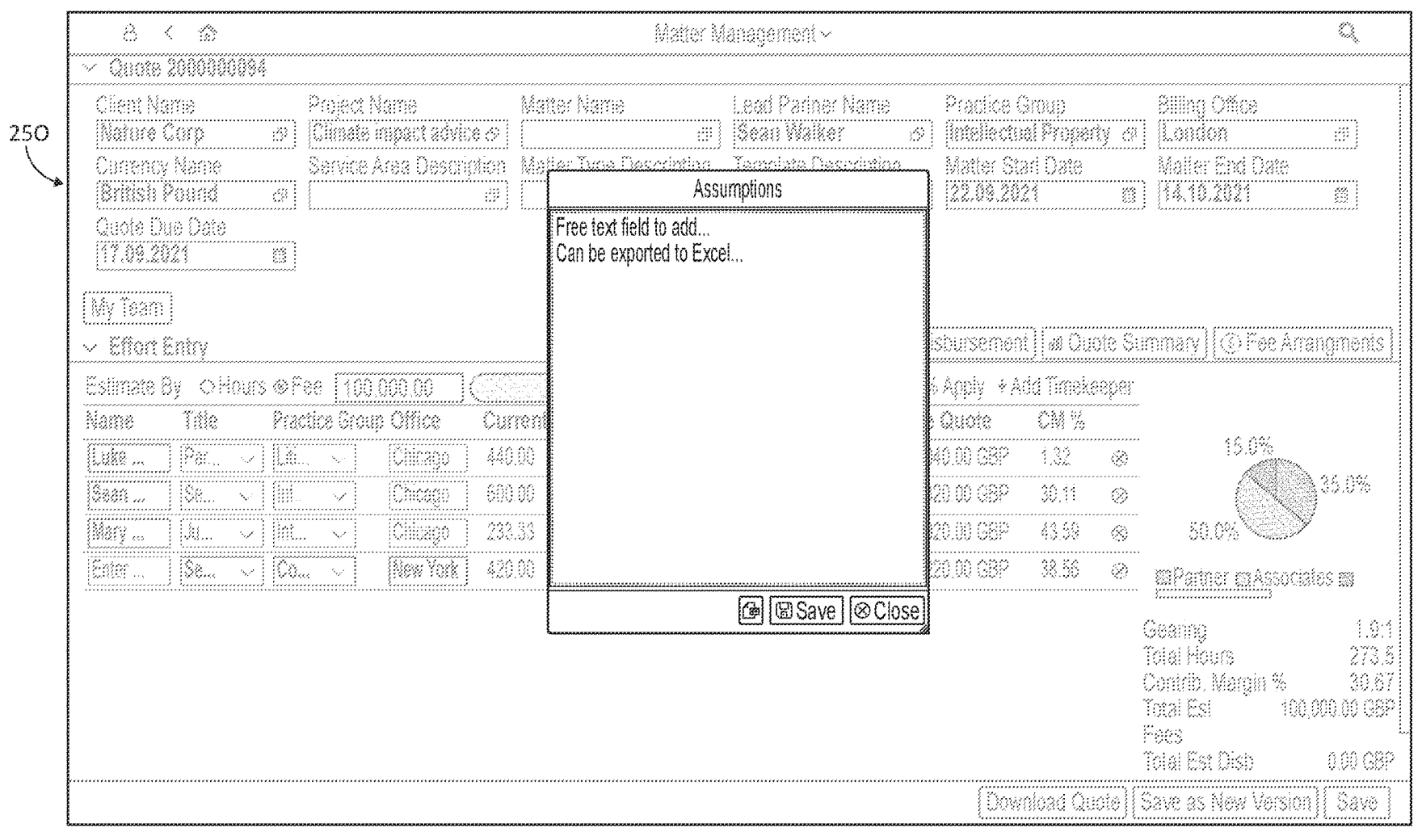

FIG. 26 illustrates an example embodiment of a fifteenth GUI 25O displayed on a user terminal 14 (e.g., a first user terminal 14a) for a user U (e.g., a first user $U_1$) in accordance with the present disclosure. The fifteenth GUI 25O is generated when the user U selects the assumptions button 84A discussed herein. The fifteenth GUI 25O enables the user U to add text tags regarding assumptions to one or more quotes generated as discussed herein.

Figure 27:
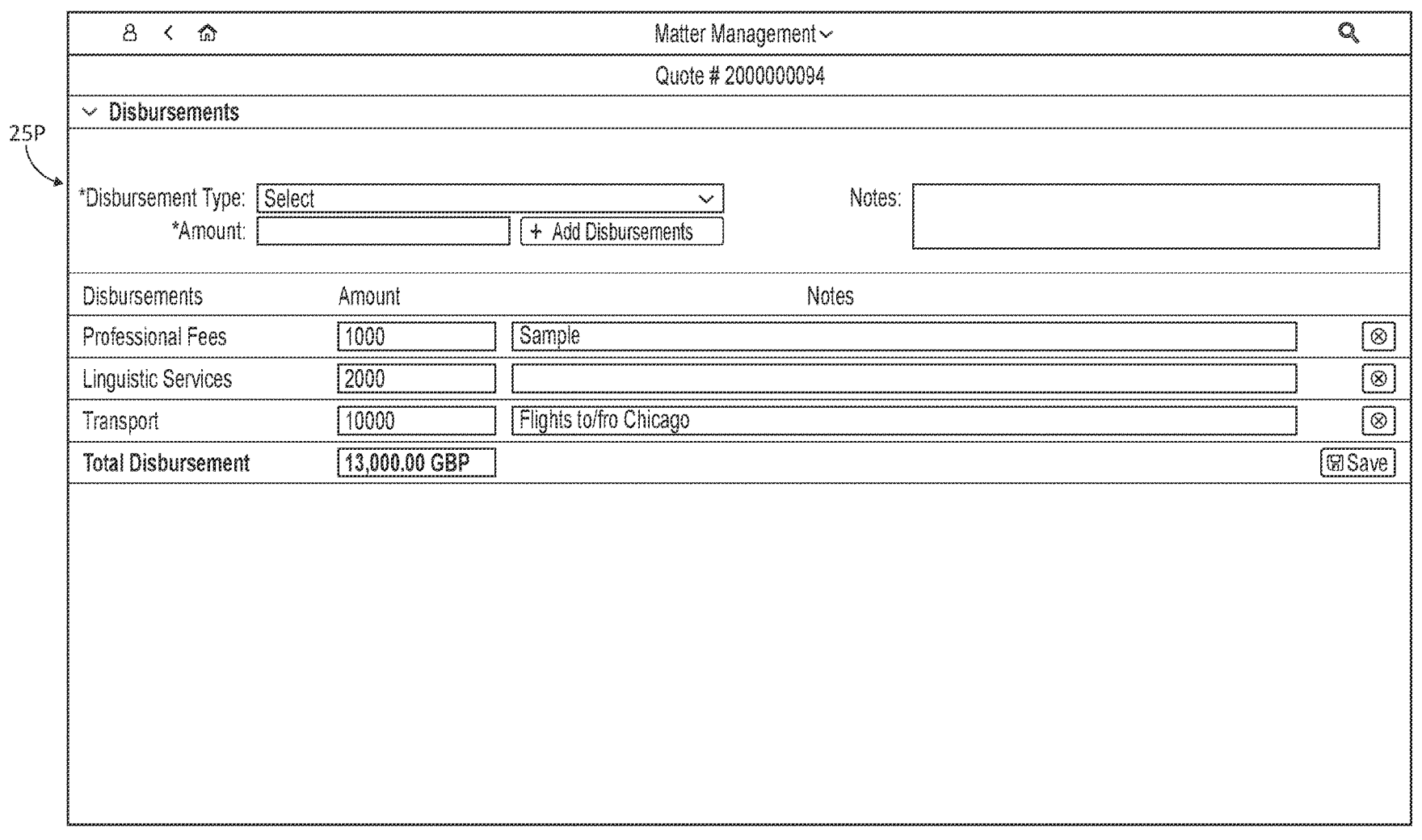

FIG. 27 illustrates an example embodiment of a sixteenth GUI 25P displayed on a user terminal 14 (e.g., a first user terminal 14a) for a user U (e.g., a first user $U_1$) in accordance with the present disclosure. The sixteenth GUI 25P is generated when the user U selects the disbursement button 84B discussed herein, The sixteenth GUI 25P enables the user U to add additional disbursements to one or more quotes generated as discussed herein.

Figure 28:
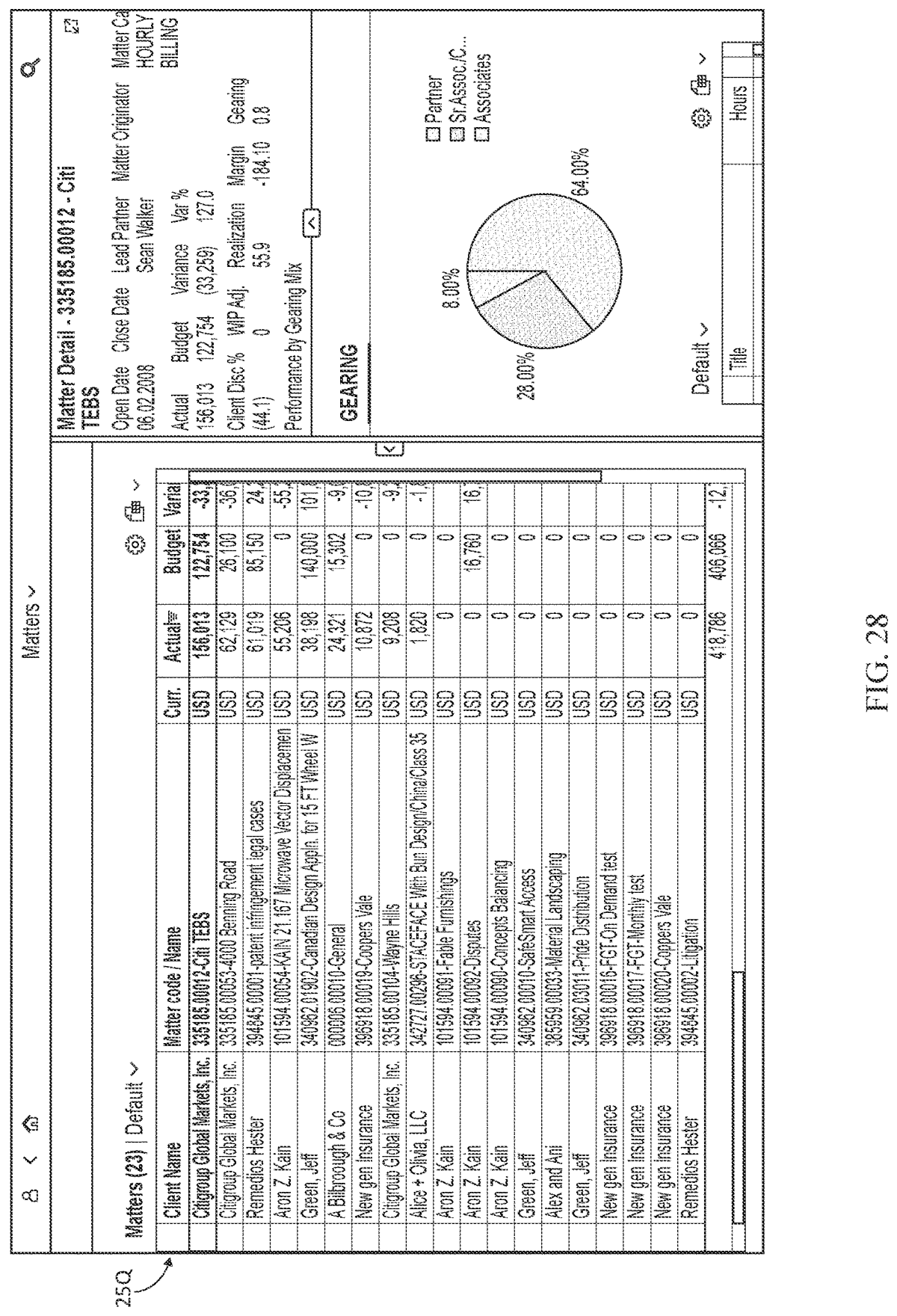

FIG. 28 illustrates an example embodiment of a seventeenth GUI 25Q displayed on a user terminal 14 (e.g., a first user terminal 14a) for a user U (e.g., a first user $U_1$) in accordance with the present disclosure. The seventeenth GUI 25Q is generated when the user U selects the at risk matter panel 90A in the thirteenth GUI 25M of FIG. 24.

Figure 29:
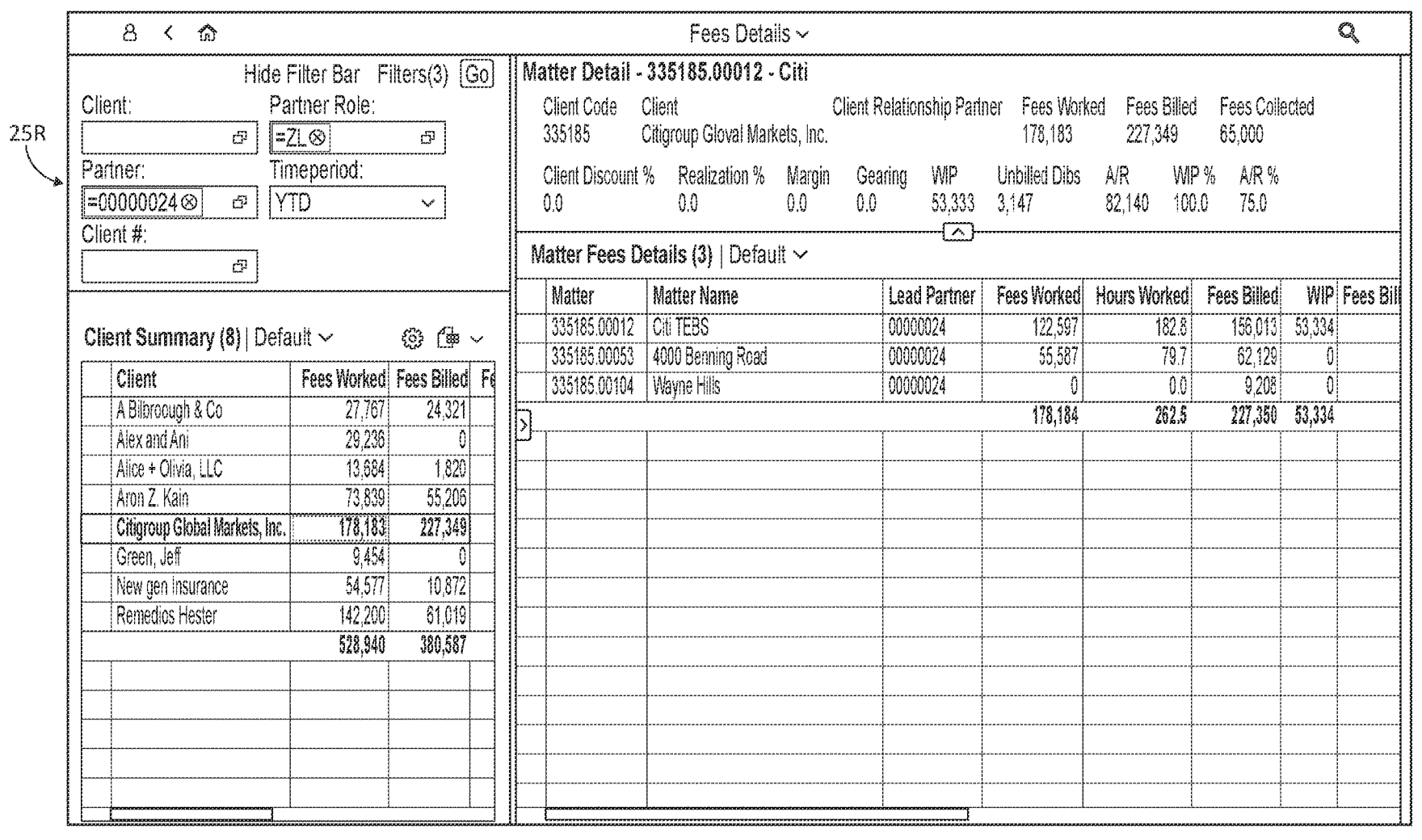

FIG. 29 illustrates an example embodiment of an eighteenth GUI 25R displayed on a user terminal 14 (e.g., a first user terminal 14a) for a user U (e.g., a first user $U_1$) in accordance with the present disclosure. The eighteenth GUI 25R is generated when the user U selects the fees panel 90B in the thirteenth GUI 25M of FIG. 24.

Figure 30:
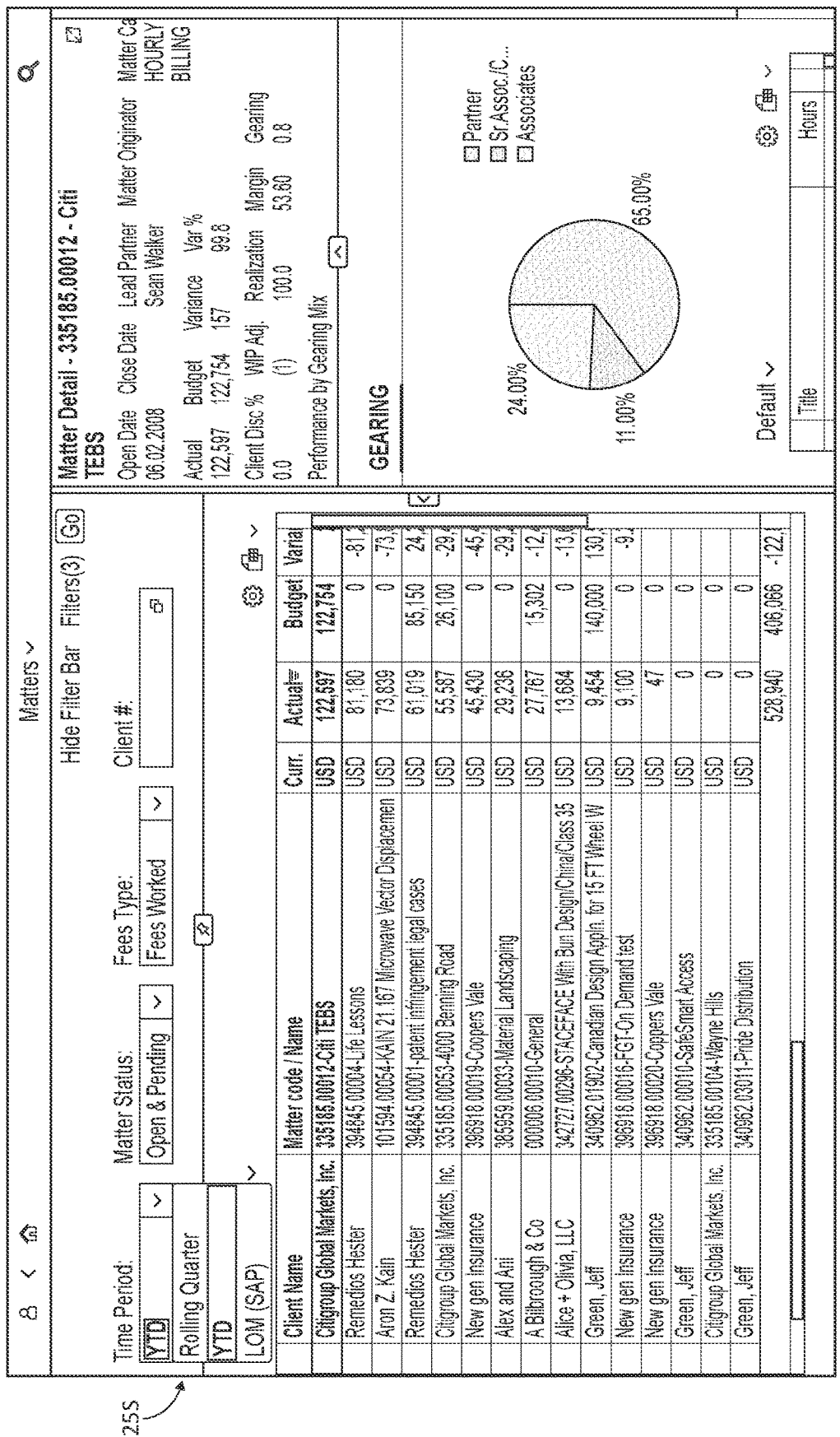

FIG. 30 illustrates an example embodiment of a nineteenth GUI 25S displayed on a user terminal 14 (e.g., a first user terminal 14a) for a user U (e.g., a first user $U_1$) in accordance with the present disclosure. The nineteenth GUI 25S is generated when the user U selects the matter performance panel 90C in the thirteenth GUI 25M of FIG. 24.

FIG. 31 illustrates an example embodiment of a twentieth GUI 25T displayed on a user terminal 14 (e.g., a first user terminal 14a) for a user U (e.g., a first user $U_1$) in accordance with the present disclosure. The twentieth GUI 25T is generated when the user U selects the new matters panel 90D in the thirteenth GUI 25M of FIG. 24.

FIG. 32 illustrates an example embodiment of a twenty-first GUI 25U displayed on a user terminal 14 (e.g., a first user terminal 14a) for a user U (e.g., a first user $U_1$) in accordance with the present disclosure. The twenty-first GUI 25U is generated when the user U selects the WIP panel 90E in the thirteenth GUI 25M of FIG. 24.

Figure 33:
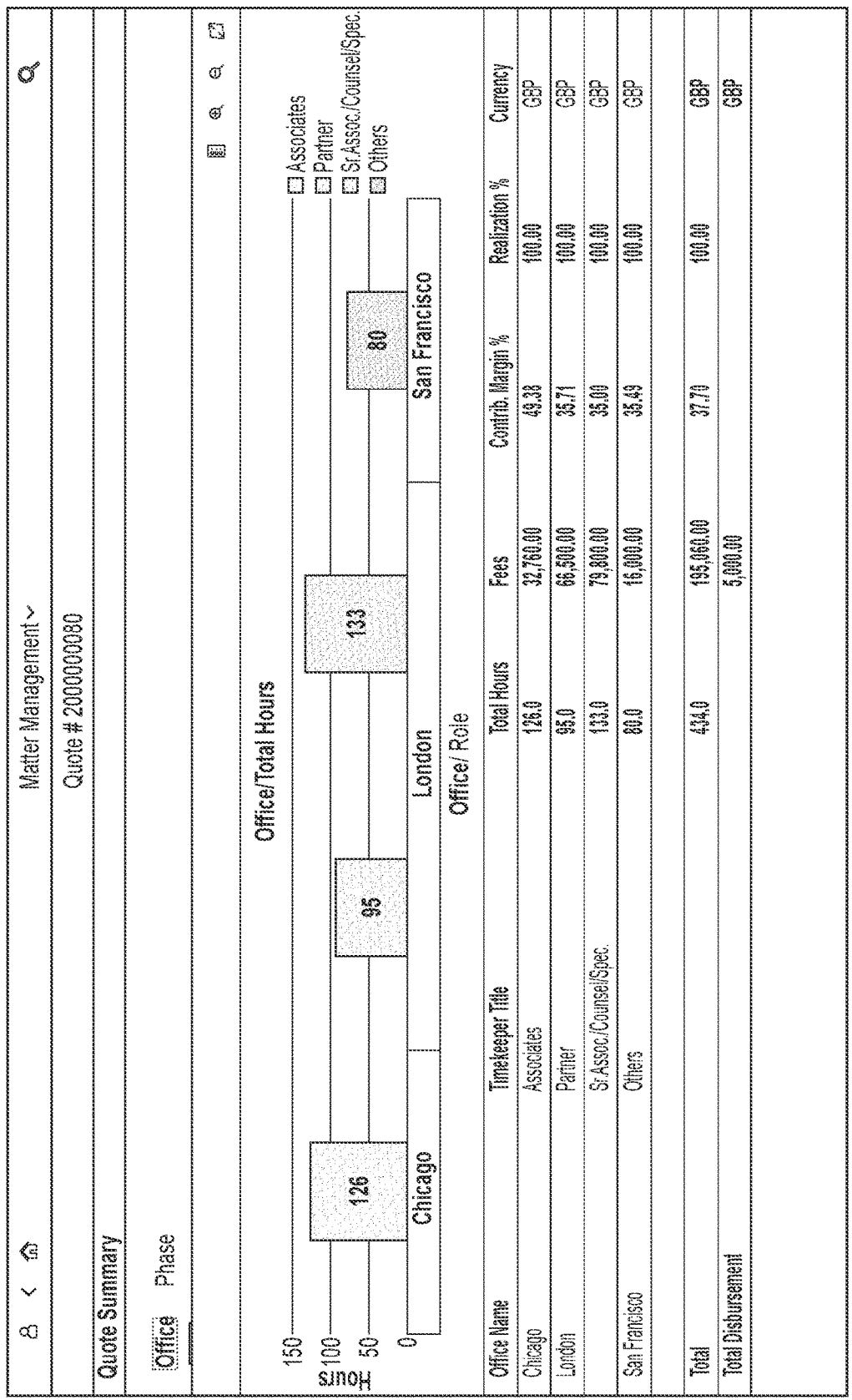

FIG. 33 illustrates an example embodiment of a twenty-second GUI 25V displayed on a user terminal 14 (e.g., a first user terminal 14a) for a user U (e.g., a first user $U_1$) in accordance with the present disclosure. The twenty-second GUI 25V is generated when the user U selects the quote-summary button 84C discussed herein.

FIG. 34 illustrates an example embodiment of a twenty-third GUI 25W displayed on a user terminal 14 (e.g., a first user terminal 14a) for a user U (e.g., a first user $U_1$) in accordance with the present disclosure. The twenty-third GUI 25W is generated when the user U selects the my-quotes icon 54D or worklist icon 54I discussed herein.

In an embodiment, the system 10 automatically sends a notification to the user terminal 14 of each user U who is being added as a member of the new team upon completion of a new quote. In an embodiment, each user U can accept or reject the new quote via his or her respective user terminal 14, thus ensuring that teams are created with members who are willing and able to handle an additional workload. In an embodiment, the system 10 further saves the time expectation from the new quote into the digital calendar of the user terminal 14 of the respective user U.

In an embodiment, the system 10 automatically compares the time expectations of each new quote with the previously existing time expectations for each member. In an embodiment, the system 10 also automatically compares the time expectations of each new quote with the current utilization of each existing member and/or with members that have not been chosen for the quote. In an embodiment, the system 10 automatically adjusts new quotes based on these comparisons.

The systems and methods can be used to create a variety of different client billing quotes. In an embodiment, the client billing quote is a billing quote that is intended to obtain work from a new client. In another embodiment, the client billing quote is a budget for an existing client related to a new or existing project for the existing client. Those of ordinary skill in the art will recognize from this disclosure that the systems and methods disclosed herein are advantageous for various types of billing quotes for different types of projects for both existing and new clients.

The systems and methods described herein are advantageous for processing and generating reliable client billing budgets and quotes because they improve the user experience, optimize processing, and conserve memory space. It should be understood that various changes and modifications to the methods described herein will be apparent to those skilled in the art and can be made without diminishing the intended advantages.

GENERAL INTERPRETATION OF TERMS

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a connecting device.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A system for generating client billing quotes, the system comprising:
    at least one memory configured to store team data corresponding to a plurality of teams, each team having a plurality of members that have worked together on one or more past matters, the team data including percentages of total work performed by each of the plurality of members of the team for the one or more past matters; and at least one processor programmed to: (i) generate a graphical user interface including a team button and a quote creation table including a plurality of first members of a first team from the plurality of teams and percentages of total work to be performed by each of the first members of the first team; (ii) based on selection of a second team having a plurality of second members using the team button, automatically retrieve workload data for one or more of the second members regarding a current workload during a defined time period; (iii) compare the workload data to a workload threshold for the one or more second members; (iv) upon determining that the current workload for the one or more second members during the defined time period exceeds the workload threshold, retrieve workload data for one or more additional members eligible to be placed on the second team and replace the one or more second members with the one or more additional members having a current workload during the defined time period that does not exceed the workload threshold; (v) regenerate the quote creation table with an adjusted second team including the one or more additional members, along with percentages of total work to be performed; (vi) enable adjustment and storage of the percentages of total work performed and entry of additional input data related to the adjusted second team; (vii) automatically adjust a second percentage of total work for one member of the adjusted second team upon an adjustment of a first percentage of total work for another member of the adjusted second team using the graphical user interface; and (vii) generate a new quote for a new client based on the adjusted percentages and additional input data related to the adjusted second team.

2. The system of claim 1, comprising a plurality of user terminals each including a user input device, the plurality of user terminals including at least a first user terminal corresponding to a first user and a second user terminal corresponding to a second user.

3. The system of claim 1, wherein the team data corresponding to the second team includes data extracted from a plurality of time entries from an existing time entry system.

4. The system of claim 1, wherein the at least one processor is programmed to send a notification to at least one user terminal of at least one of the members of the adjusted second team upon generation of the new quote.

5. The system of claim 1, wherein the at least one processor is configured to determine whether a total hours value for at least one second member would push the second member over an hours threshold for a time period indicated by the input data.

6. The system of claim 5, wherein the at least one processor is configured to determine an adjustment to the time period indicated by the input data based on the hours threshold.

7. A method of generating client billing quotes, the method comprising:

generating a first graphical user interface on a first user terminal that enables a first user to select a first team or a second team from a plurality of teams stored in a central memory, the first team including a plurality of first members, the plurality of first members having worked together on one or more past first matters, the second team including a plurality of second members including at least a second user, the plurality of second members having worked together on one or more past second matters;

generating a second graphical user interface on the first user terminal using team data corresponding to the first team, the team data including percentages of total work performed by each of the plurality of first members of the first team for the one or more past first matters, the second graphical user interface including a team button and a quote creation table automatically populated with percentages of total work performed by each of the plurality of first members of the first team and enabled for entry of additional input data related to the plurality of first members of the first team;

based on selection of the second team using the team button,
  automatically retrieving workload data for one or more of the second members regarding a current workload during a defined time period,
  comparing the workload data to a workload threshold for the one or more second members,
  upon determining that the current workload for the one or more second members during the defined time period exceeds the workload threshold, retrieving workload data for one or more additional members eligible to be placed on the second team and replacing the one or more second members with the one or more additional members having a current workload during the defined time period that does not exceed the workload threshold, and
  regenerating the quote creation table with an adjusted second team including the one or more additional members, along with percentages of total work to be performed by each of the second members and enable entry of additional input data related to the adjusted second team;

automatically adjusting and storing a second percentage of total work for one member of the adjusted second team upon an adjustment of a first percentage of total work for another member of the adjusted second team using the second graphical user interface;

generating a new quote for a new client based on the adjusted percentages and additional input data related to the adjusted second team; and sending a notification to a second user terminal of the second user regarding the new quote.

8. The method of claim 7, wherein both the first user and the second user are members of the second team.

9. A method of generating client billing quotes, the method comprising:

receiving a selection of a first team from a plurality of teams stored in a central memory, the first team including a plurality of members that have worked together on one or more past matters;

generating a graphical user interface using first team data corresponding to the first team, the first team data including percentages of total work to be performed by each of the plurality of members of the first team, the graphical user interface including a team button and a quote creation table automatically populated with the percentages of total work to be performed by each of the plurality of first members of the first team and enabled for adjustment and storage of the percentages of total work to be performed by each of the plurality of first members of the first team and entry of input data related to the plurality of first members of the first team;

based on a selection of a second team having a plurality of second members using the team button on the graphical user interface, retrieving workload data for one or more of the second members regarding a current workload during a defined time period, comparing the workload data to a workload threshold for the one or more second members, upon determining that the current workload for the one or more second members during the defined time period exceeds the workload threshold, retrieving workload data for one or more additional members eligible to be placed on the second team and replacing the one or more second members with the one or more additional members having a current workload during the defined time period that does not exceed the workload threshold, and regenerating the graphical user interface with second team data corresponding to an adjusted second team, along with percentages of total work to be performed by members of the adjusted second team, the quote creation table enabled for adjustment and storage of the percentages of total work performed by the adjusted second team and entry of input data related to the adjusted second team;

automatically adjusting a second percentage of total work for one member of the adjusted second team upon an adjustment of a first percentage of total work for another member of the adjusted second team using the graphical user interface; and generating a new quote for a new client based on the adjusted percentages and additional input data related to the adjusted second team.

10. The method claim 9, wherein
the team data corresponding to the second team includes data extracted from a plurality of time entries from an existing time entry system.

11. The method of claim 9, comprising
sending a notification to at least one user terminal of at least one of the members of the adjusted second team upon generation of the new quote.

12. The method of claim 9, comprising
determining whether a total hours value for at least one second member would push the second member over an hours threshold for a time period indicated by the input data.

13. The method of claim 12, comprising
determining an adjustment to the time period indicated by the input data based on the hours threshold.

* * * * *